(12) United States Patent
Itakura et al.

(10) Patent No.: US 6,356,893 B1
(45) Date of Patent: Mar. 12, 2002

(54) MESSAGE SEARCHING SYSTEM AND TERMINAL

(76) Inventors: Yuichiro Itakura, 2-14-19, Natsumi, Funabashi, Chiba; Yuichiro Tsutsui, 4-3, Nakamachi 2 chome, Meguro-ku, Tokyo; Nobuyuki Fujita, 19-4, Imaikamicho, Nakahara-shi, Kawasaki, Kanagawa, all of (JP)

( * ) Notice: Subject to any disclaimer, the term of this patent is extended or adjusted under 35 U.S.C. 154(b) by 0 days.

(21) Appl. No.: 09/188,571

(22) Filed: Nov. 10, 1998

Related U.S. Application Data

(63) Continuation of application No. PCT/JP97/01546, filed on May 8, 1997.
(60) Provisional application No. 60/019,455, filed on Jun. 11, 1996.

(30) Foreign Application Priority Data

May 10, 1996 (JP) .............................................. 8-139690

(51) Int. Cl.[7] .............................................. G06F 17/30
(52) U.S. Cl. .............................. 707/3; 707/10; 705/10; 709/217
(58) Field of Search .................... 707/10, 104; 709/202, 709/203, 217–219; 705/14

(56) References Cited

U.S. PATENT DOCUMENTS

| | | | | |
|---|---|---|---|---|
| 5,019,963 A | | 5/1991 | Alderson et al. | ........... 364/200 |
| 5,446,919 A | * | 8/1995 | Wilkins | ........................ 725/35 |

(List continued on next page.)

FOREIGN PATENT DOCUMENTS

| | | | |
|---|---|---|---|
| EP | 0 284 924 | 10/1988 | |
| EP | 0 749 081 A1 | 12/1996 | |
| EP | 0 749 081 A1 | * 12/1996 | ........... G06F/17/60 |
| JP | 59-229646 | 12/1984 | |
| JP | 63-262724 | 10/1988 | |

(List continued on next page.)

OTHER PUBLICATIONS

Kamiba, Tomonari "The Krakatoa Chronicle: Interactive Personalized Newspaper Using Agent Function on WWW", IPSG SIG Notes, 95, No. 115, pp. 13–18, Nov. 30, 1995). [English Language Translation].*

(List continued on next page.)

Primary Examiner—Jean R. Homere
Assistant Examiner—Luke S Wassum
(74) Attorney, Agent, or Firm—Steven C. Sereboff

(57) ABSTRACT

A message searching and system and a terminal, which display messages to terminal users based on their individual characteristics profile, even when a plurality of users use the same terminal and even when users copy and use the same program. The system includes a message user database for storing records defining user characteristics profiles of terminal users, and a transmittal condition database for storing searching conditions for each message which may be transmitted to the terminal. This system detects a necessity to revise the user characteristics when communicating with the terminal, and revises the user characteristics if necessary. This system reads user characteristics from the message user database, and searches for appropriate messages from the transmittal condition database based on the user characteristics and characteristics associated with each message identifier. The message user database stores each user's birth date and the last system communication date. The user's characteristics profile is updated based on various conditions. For example, if the date obtained by adding a predetermined period to the user's birth date is after the last communication date with the user, the characteristics profile is revised.

32 Claims, 23 Drawing Sheets

U.S. PATENT DOCUMENTS

| | | | | |
|---|---|---|---|---|
| 5,613,108 A | * | 3/1997 | Morikawa | 707/200 |
| 5,624,119 A | * | 4/1997 | Leake | 273/269 |
| 5,649,131 A | * | 7/1997 | Ackerman et al. | 345/744 |
| 5,664,063 A | * | 9/1997 | Johnson et al. | 358/1.1 |
| 5,724,567 A | * | 3/1998 | Rose et al. | 707/2 |
| 5,737,601 A | * | 4/1998 | Jain et al. | 707/201 |
| 5,740,549 A | * | 4/1998 | Reilly et al. | 705/14 |
| 5,761,662 A | * | 6/1998 | Dasan | 707/10 |
| 5,765,170 A | * | 6/1998 | Morikawa | 707/200 |
| 5,809,242 A | * | 9/1998 | Shaw et al. | 709/217 |
| 5,848,396 A | * | 12/1998 | Gerace | 705/10 |
| 5,913,040 A | * | 6/1999 | Rakavy et al. | 709/232 |
| 5,918,014 A | * | 6/1999 | Robinson | 709/219 |
| 6,029,175 A | * | 2/2000 | Chow et al. | 707/104 |
| 6,065,002 A | * | 5/2000 | Knotts et al. | 707/4 |
| 6,151,600 A | * | 11/2000 | Dedrick | 707/10 |
| 6,157,946 A | * | 12/2000 | Itakura et al. | 709/217 |

FOREIGN PATENT DOCUMENTS

| | | | | |
|---|---|---|---|---|
| JP | | 2-83622 | 3/1990 | |
| JP | | 2-257392 | 10/1990 | |
| JP | | 2-272650 | 11/1990 | |
| JP | | 5-61834 | 3/1993 | |
| JP | | 7-84849 | 3/1995 | |
| JP | | 7-311776 | 11/1995 | |
| WO | WO-97/21183 A1 | * | 6/1997 | G06F/151/00 |
| WO | | 97/21183 | 6/1997 | |

OTHER PUBLICATIONS

Nakajima et al. "Cooperation Among News Filtering Agents", Multimedia Communication and Distributed Processing System Workshop, Information Processing Workshop Article Collection, vol. 95, No. 2, pp. 63–69, Oct. 25, 1995. [English Language Translation].*

IBM Technical Disclosure Bulletin, "Online Data Base Level Control", vol. 18, No. 8, p. 2663, Jan. 1976.*

Nakajima, et al., "Collaboration of New Filtering Agent", Information Processing Society Workshop Article, vol. 95, No. 2, 1995, pp. 63–69.

Kamiba, "The Krakatoa Chronicle, Interactive Personal Newspaper Utilizing Agent Function of WWW", Information Processing Society Research Report OS 71–3, DPS–73–3) vol. 95, No. 115, 1995, pp. 13–18.

"NIKKEI COMMUNICATION" Apr. 1996, pp. 82 –84.

* cited by examiner

MESSAGE USER DATABASE 34

| MESSAGE USER ID | MESSAGE USER PASSWORD | PROVIDER ID | PROVIDER USER ID | DISPLAYED TIME | DATE OF BIRTH | SEX | MARRIED | OCCUPATION | ADDRESS | DRINKING | SMOKING | NAME | LAST COMMUNICATION TIME |
|---|---|---|---|---|---|---|---|---|---|---|---|---|---|
| XXX | YYY | A | ZZZ | 1:00:15 | 1968.6.2 | MALE | NO | CORPORATION | SHINJUKU-KU TOKYO | YES | NO DATA | TARO YAMADA | 1996.3.31 23:00 |
| AAA | BBB | B | CCC | 0:15:34 | 1967.1.7 | FEMALE | YES | FREE | ICHIKAWA CHIBA | NO | NO | ICHIRO TANAKA | 1996.4.4 21:15 |
| OOO | PPP | A | QQQ | 15:23:56 | 1980.11.24 | MALE | NO | STUDENT | SHIBUYA-KU TOKYO | NO DATA | NO DATA | JIRO SUZUKI | 1996.4.22 00:45 |
| ...... | ...... | ...... | ...... | ...... | ...... | ...... | ...... | ...... | ...... | ...... | ...... | ...... | ...... |

ITEM REVISION TIME : 1996.4.1 00:00

*FIG.4*

TRANSMITTAL CONDITION DATABASE 36

| MESSAGE URL | INDIVIDUAL LIMIT TYPE | INDIVIDUAL LIMIT | TOTAL LIMIT TYPE | TOTAL LIMIT | DISPLAYED TIME | AGE | SEX | MARRIED | OCCUPATION | ADDRESS | DRINKING | SMOKING |
|---|---|---|---|---|---|---|---|---|---|---|---|---|
| --- | DAY | 3 | DAY | 1000 | --- | 18-22 | MALE | NO | CORPORATION | TOKYO | YES | --- |
| --- | TOTAL | 10 | MONTH | 10000 | --- | --- | FEMALE | YES | STUDENT | KANAGAWA | --- | --- |
| --- | MONTH | 8 | MONTH | 500 | 1996.1.1 /12:00 | --- | --- | NO | --- | KANTO | --- | YES |
| --- | ... | ... | ... | ... | ... | ... | ... | ... | ... | ... | ... | ... |

FIG.5

PROVIDER USER DB 25

| PROVIDER USER ID | PROVIDER USER PASSWORD | CHARGE TIME | CHARGE |
|---|---|---|---|
| XXX | YYY | 1:20:20 | ¥120 |
| ......... | ......... | ......... | ......... |

*FIG.11*

CONNECTION LOG 38

| PROVIDER ID | PROVIDER USER ID | EVENT | DATE | TIME |
|---|---|---|---|---|
| A | XXX | LOGON | 1996.1.31 | 0:15:00 |
| A | XXX | CHARGE HALT | 1996.1.31 | 0:15:01 |
| B | AAA | LOGON | 1996.1.31 | 1:21:15 |
| A | XXX | CHARGE START | 1996.1.31 | 2:09:05 |
| A | XXX | CHARGE HALT | 1996.1.31 | 2:15:08 |
| B | BBB | | | |
| A | CCC | | | |

FIG.14

MESSAGE USER DATABASE 34

| MESSAGE USER ID | MESSAGE USER PASSWORD | PROVIDER ID | PROVIDER USER ID | DISPLAYED TIME | ITEM TYPE | ITEM DATA | ITEM TYPE | ITEM DATA | ITEM TYPE | ITEM DATA | | LAST COMMUNI-CATION TIME |
|---|---|---|---|---|---|---|---|---|---|---|---|---|
| XXX | YYY | A | ZZZ | 1:00:15 | 1 | 1968.6.2 | 2 | MALE | 3 | UNMARRIED | | 1996. 3. 31 23:00 |
| AAA | BBB | B | CCC | 0:15:34 | 1 | 1967.1.7 | 3 | MARRIED | 4 | NO DATA | | 1996. 4. 4 21:15 |
| OOO | PPP | A | QQQ | 15:23:56 | 1 | 1980.11.24 | 2 | MALE | 3 | UNMARRIED | | 1996. 4. 22 00:45 |
| ... | ... | ... | ... | ... | ... | ... | ... | ... | ... | ... | | ... |

ITEM REVISION TIME 1996.4.1 00:00

*FIG.21*

| TYPE | NAME | TYPE | RANGE | DATA LENGTH |
|---|---|---|---|---|
| 1 | DATE OF BIRTH | DATE | 1850.1.1 ~ 2000.1.1 | 8 BITS |
| 2 | SEX | NUMBER | 0~2 | 1 BIT |
| 3 | MARRIED | NUMBER | 0~2 | 1 BIT |
| 4 | SMOKING | NUMBER | 0~2 | 1 BIT |
| 5 | OCCUPATION | NUMBER | 0~31 | 4 BITS |
| 6 | ADDRESS | TEXT | ASCII CODES | 128 BITS |
| 7 | DRINKING | NUMBER | 0~2 | 1 BIT |
| 8 | ⋮ | ⋮ | ⋮ | ⋮ |
| 9 | | | | |
| 10 | | | | |
| 11 | | | | |
| 12 | | | | |

*FIG.22*

MESSAGE SEARCHING SYSTEM AND TERMINAL

This is a continuation of International Appln No. PCT/JP97/01546 filed May 8, 1997 which designated the U.S. This application claims the benefit of U.S. Provisional Application No. 60/019,455, filed Jun. 11, 1996.

BACKGROUND OF THE INVENTION

1. Field of Invention

The present invention relates to a message searching system and a terminal, which displays information obtained from a computer communications network, such as the Internet. For those designated countries, which permit the incorporation by reference, the following patent applications are hereby incorporated by reference.

1. Appln. No. H8-9521 filed on Jan. 23, 1996
2. Appln. No. H8-67278 filed on Feb. 28, 1996
3. Appln. No. H8-139689 filed on May 10, 1996
4. Appln. No. H8-139690 filed on May 10, 1996
5. Appln. No. H8-163679 filed on Jun. 5, 1996

Application Ser. No. 09/125,833 filed Feb. 26, 1997, entitled "Communication System Capable of Providing User with Picture Meeting Characteristics of User and Terminal Equipment and Information Providing Device Used for the Same," now U.S. Pat. No. 6,157,9466, issued Dec. 5, 2000.

Application Ser. No. 09/633,407 filed Aug. 7, 2000, entitled "Advertising Supported Internet Access Service."

Application Ser. No. 09/125,894 filed Aug. 27, 1998, entitled "Communication System for Distributing Such Message as Advertisement to User of Terminal Equipment."

Application Ser. No. 09/206,385 filed Dec. 7, 1998, entitled "Information Provider, Terminal And System And Recording Medium For The Terminal."

application Ser. No. 09/117,331 filed Nov. 6, 1998, entitled "System For Displaying Two Independent Images From Network."

Application Ser. No. 09/276,708 filed Mar. 26, 1999, entitled "Terminal Which Stores Information on Communication Network in Local Memory Automatically."

2. Description of Related Art

Various kinds of information are available to users through communications networks such as the Internet and other personal computer networks such as Bulletin Board Services (BBS), etc. Typically, a terminal, such as a personal computer, is connected via a modem and a telephone line, local area network, or wide area network, etc., to a computer, such as a 'server', operated by an information provider. A user, using his own terminal, can access whatever data the information provider makes available. A user can also access other information providers through the communications network to which the first information provider is connected. Thus, a user can receive information from various information providers.

An information provider or some enterprise connected to the information provider identifies a user based on a unique user ID and a password to determine whether to provide access to the information to the user and may charge a fee for providing information.

Information supplied to the user is typically displayed in a single window on the user's computer or terminal display. The user can scroll displayed information or switch to a submenu screen. An information provider may provide designated information selected by the user together with additional information such as an advertisement. The additional information is displayed in the same window as the designated information sought by the user.

In a typical arrangement, when a user scrolls his display the additional information, being in the same window, disappears. This prevents the additional information (such as an advertisement) from being efficiently provided to the user. This is a problem for the advertiser. To overcome this problem, Japanese Patent Application H8-67279, which is commonly owned with this application, proposes an arrangement for displaying two separate and distinct windows on a user's display. One of the two windows displays the designated information requested by the user. The other of the two windows is for the additional information, such as an advertisement. Advertisements displayed in the second window can be selected, based on a user characteristic profile, so as to be appropriate for a particular user. Such a profile might include characteristics such as, but not limited to, age, gender, marital status, a previously expressed interest, etc.

As a user's characteristics change over time, the advertisements presented in the second window can be changed based on the users changed profile. For example, some advertisements may target a particular age range.

Information available via communications networks, such as the Internet, change significantly over time. Therefore it is desirable to be able to supply selected information related to newly available content and for a computer or terminal to be able to keep track of a user's characteristic profile. It is also desirable to be able to keep track of a plurality of user characteristic profiles even when a plurality of users have copied and use the same program to access information. This invention was conceived to provide a message searching system and a terminal, which can meet such objectives.

SUMMARY OF THE INVENTION

To achieve the above object, the present invention provides a message searching system. It includes a message user database for storing user characteristics profiles. A computer or terminal is connected to the message searching system through a communication line. A transmittal condition database stores a list of messages that can be transmitted to the computer. Each message listing includes a message ID and searching conditions that should be satisfied before a particular message should be sent for display. Means are provided for determining when it is necessary to revise a characteristics profile when communicating with a user. Means are provided for revising the characteristics profile when necessary. Means are provided for reading the characteristics profile of a terminal user in response to a request from the terminal. Means are provided for searching the transmittal condition database based on the characteristics profile read from the message user database and locating IDs of messages to be sent to the user.

As one example, the characteristics profile might include each user's birth date and the last communication date associated with that user. The detector determines that the characteristics profile needs to be revised when the date obtained by adding a predetermined value to the user's birth date has already passed at the time of user's connection to the message searching system and is after the last revision.

Means are provided for adding a new item (data field) to the message user database, and means for storing an indicator, such as an 'item revision time' when the new item was added to the message user database. The detector determines that the user's characteristics profile needs to be revised when the last communication date is before the item revision time. As an alternative, the detector might determine that the characteristics profile needs to be revised when the date obtained by adding a predetermined value to the user's birth date has already passed at the time of the user's connection to the message searching system and that connection has occurred after the latest item revision time of the transmittal condition database. As another alternative, the detector might simply determines that the characteristics profile needs to be revised when the last revision time is before the item revision time.

Means are provided for comparing the characteristics profile revision time of a particular user who is using the terminal, the revision time being stored in the terminal, with the characteristics revision time stored in the message user database when the terminal is connected to the message searching system. This is particularly helpful when a plurality of users use the same terminal. Means are provided for transmitting the characteristics profile in the message user database to the terminal when the characteristics revision time in the message user database is after the characteristics revision time in the terminal.

Means are provided for comparing the characteristics revision time of the user who is using the terminal, which is stored in the terminal, with the characteristics revision time in the message user database. When the data in the message user database is lagging that which is stored in the terminal, the message user database is updated.

There us provided a database for storing ID information for identifying each of a plurality of user items, as well as attributes, and range and size of each item. The message user database includes an ID for each user, which corresponds to his characteristics.

The invention also provides a terminal that communicates through a communication line with a message searching system which contains characteristics of users of a plurality of terminals. The terminal has a storage for storing characteristics of users of the terminal, and a detector for detecting a necessity to revise the characteristics when communicating with the message searching system. The terminal requests through a communication line a dialog for revising the characteristics of the user of the terminal when the necessity of revision is detected. The terminal revises the characteristics stored in the storage using the dialog received from the communication line.

According to one aspect of the invention, the terminal stores the user's birth date and date of last communication with the message searching system. The characteristic profile is revised based on whether the date obtained by adding a predetermined period to the user's birth date has already passed at the time of the communication with the message searching system and is after the last communication date.

The terminal is provided with means for receiving from the message user database an item revision time indicating when a new item (data field) was added to the message user database. The detector determines that it is necessary to revise the characteristics stored in the storage when the last communication date is before the item revision time.

According to one aspect of the invention, the terminal stores the user's birth date and the characteristic revision time. The detector detects a necessity to revise the characteristics based on whether the date obtained by adding a predetermined period to the user's birth date has already passed at the time when the user connects to the message searching system and is after the last revision time.

The terminal can further include means for receiving an item revision time indicating when a new item was added to the message user database, from the message user database. The detector determines that it is necessary to revise the characteristics stored in the storage when the last revision time is before the item revision time.

According to one aspect of the invention, the message searching system contains characteristics of each user. The terminal includes means for comparing the characteristics revision time about the user of the terminal, which is stored in the storage, with the characteristics revision time stored in the message searching system, when the terminal is connected to the message searching system; and means for transmitting the characteristics stored in the storage to the message searching apparatus when the characteristics revision time stored in the message searching system is before the last revision time of the message information stored in the storage.

According to another aspect of the invention, the terminal includes means for comparing the characteristics revision time of the user of the terminal, which is stored in the terminal, with the characteristics revision time stored in the message searching system. Means are provided for downloading characteristics stored in the message searching system when the characteristics revision time stored in the message searching system is after the characteristics revision time stored in the terminal. Further, means are provided for revising the characteristics stored locally in the terminal.

The terminal has a detector for detecting that the characteristics stored locally have been revised by the user. Means are provided for uploading locally revised characteristics to the message searching system.

The terminal can be provided with a CPU for processing information. The terminal has a storage for storing process information which is to be read and processed by CPU. The terminal also has a memory for storing the location where the process information is stored in the storage. Means are provided for inputting ID information for identifying the user of the terminal. Determination means are provided for determining the location of the process information in the storage when processing the process information. Re-input means are provided for requesting the user of the terminal to input the ID again when the location of the process information stored in the memory is different from the location of the process information determined by the determination means. User determination means are provided for determining that, when the ID inputted through the input means is different from the ID inputted through the re-input means, the user who is using the terminal is different from the user who originally inputted the ID through the input means.

The terminal has input means including means for inputting a user password. A re-input means includes means for requesting the user to input the password again when the location of the process information stored by the memory is different from the location of the process information determined by the determination means. The user determination means includes means for determining that, when the password inputted through the input means is different from the password inputted through the re-input means, a user who is using the terminal is a different person from the user who originally inputted the ID.

According to an aspect of the invention, there is provided process information to be executed by a CPU. Alternatively, the process information may be data which is read out by the CPU. The terminal further including means for communicating with an information processor through a communication line. It also includes means for inquiring whether the ID and the password which were inputted through the re-input means are registered in the information processor, when the user determination means determines that a user who is using the terminal is a different person from the user who originally inputted the ID through the input means.

BRIEF DESCRIPTION OF THE DRAWINGS

FIG. 4 illustrates the structure of the message user database 34.

FIG. 5 illustrates the structure of the transmittal condition database 36.

FIG. 11 illustrates a structure of the provider user database 25.

FIG. 14 illustrates a structure of the connection log 28.

FIG. 21 illustrates the structure of the message user database 34 of a third embodiment of the invention.

FIG. 22 illustrate a list of item types of the third embodiment of the invention.

DETAIL DESCRIPTION OF THE INVENTION

Figure 1:
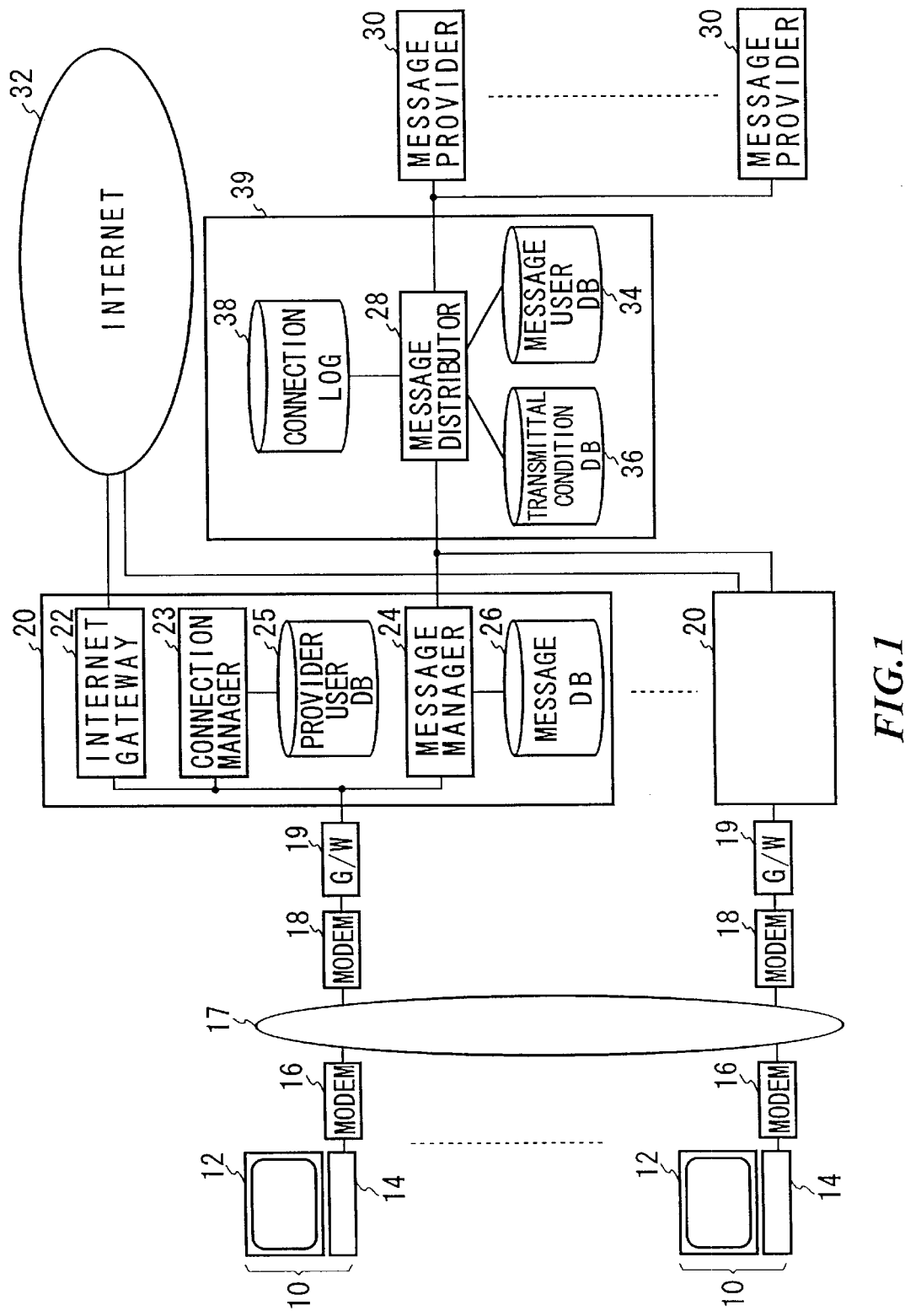
FIG. 1 is a block diagram showing the overall structure of the display system according to one embodiment of the invention.

Various presently preferred embodiments will be described with reference to the attached drawings, wherein like reference numerals indicate like or corresponding elements through the drawings.

First Embodiment

FIG. 1 is a block diagram showing a first embodiment of a system according to the present invention. Terminals 10 are connected to each information provider 20 through modems such as modems 16 and 18, a public communication network 17, and public network gateways 19. Each information provider 20 is managed by a so-called Internet Provider.

One or more message providers 30 are connected to a message distribution system 39 through a dedicated line. Massage providers 30 supply the message distribution system 39 additional information such as an advertisement (message), transmittal conditions for respective messages, and the web home page address of the message provider 30 on the Internet 32. Messages may include still image, dynamic image, voice sound, and any combinations of these. The message distribution system 39 (message searching system) includes the message distributor 28 (message searcher), message user database 34, transmittal condition database 36, and connection log 38. The transmittal condition database 36 stores transmittal conditions of respective messages. The message user database 34 stores data about message users of terminals 10.

The message distributor 28 is connected to information providers 20 through dedicated lines. The message distributor 28 transmits the message provided from the message provider 30 to each information provider 20. The message contains data indicating an Internet Web page address of the message provider. The message manager 24 in the information provider 20 receives the message from the message distribution system 39, and stores the message in a message database 26 along with an associated message ID (URL).

The terminal 10 can receive information, such as a home page, from the Internet 32 through an Internet gateway 22 of the information provider 20. The terminal 10 receives a message from the message manager 24. The message manager 24 reads out the message from the message database 26 and transmits the message to the terminal 10 based on the request from the terminal 10. The user of a terminal 10 has a provider user ID and a provider password which are used to connect through a public network gateway 19 to the Internet gateway 22, together with a message user ID and a message user password which are used to obtain the message from the message manager 24.

If a plurality of information providers 20 are connected to the public network 17, the user can connect to any of the information providers 20. For this purpose, a user may have many provider IDs for use with respective information providers 20. However, a single message user ID can be used for all information providers 20.

Figure 2:
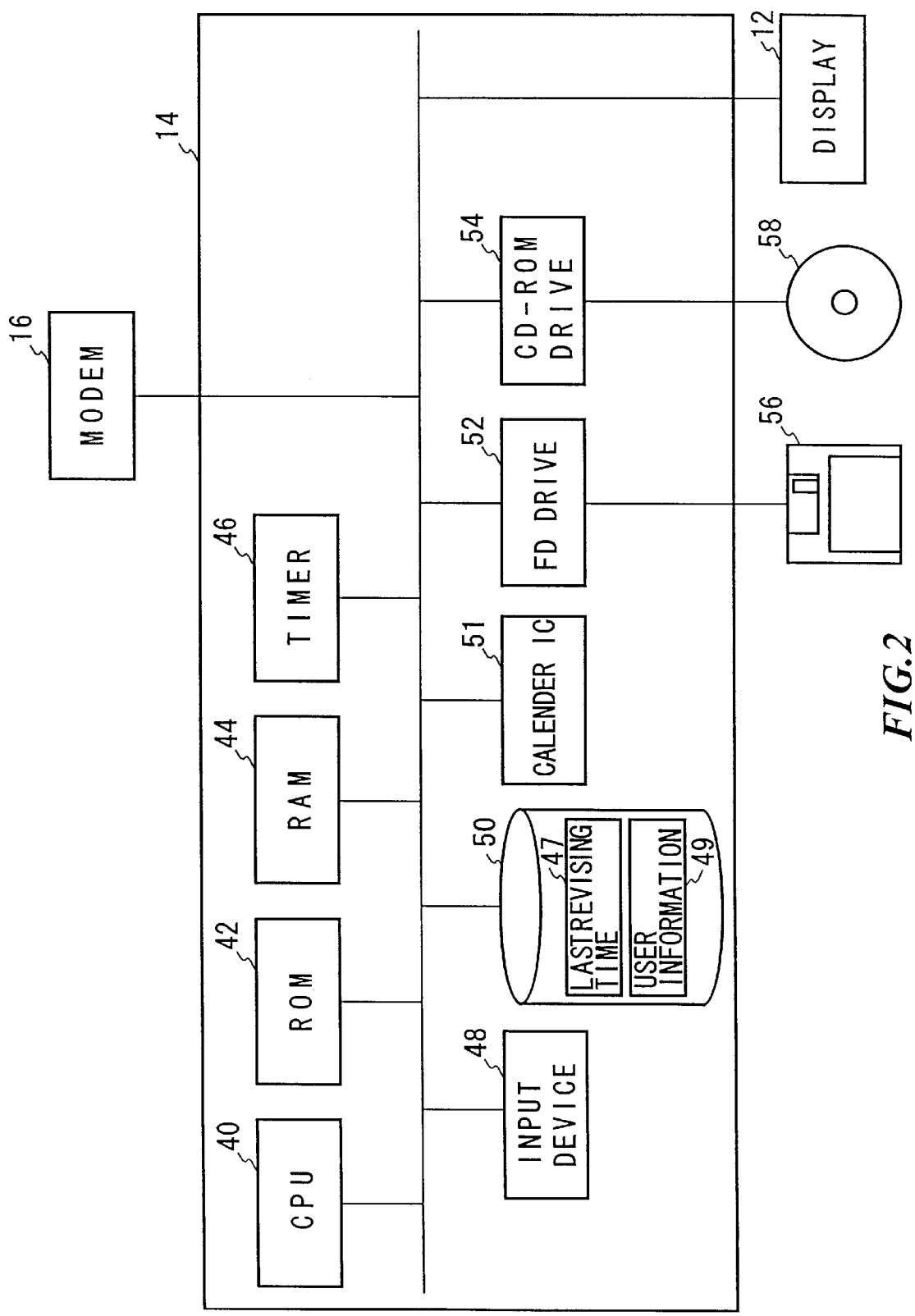
FIG. 2 is a block diagram showing the structure of the terminal 10.

FIG. 2 is a block diagram showing a hardware arrangement of the main body 14 of the terminal 10. CPU 40 executes programs stored in a ROM 42 and a RAM 44. A timer 46 counts predetermined periods. A user inputs data through an input device 48. A hard disk drive 50, as an example of the storage device, stores image data, user information 49, such as a characteristic profile, a last revising date of the characteristic profile, and programs for operating CPU 40.

A battery-backed up calendar IC 51 supplies the current date and time to CPU 40. A floppy disk drive 52 reads data and/or a program from the floppy disk 56 and provides it to CPU 40. A CD-ROM drive 54 reads out data or a program from a CD-ROM 58 to provide it to CPU 40. The main body 14 also has a display interface which is used to connect to the modem 16, and a modem interface which is used to connect to the display 12.

Figure 3:
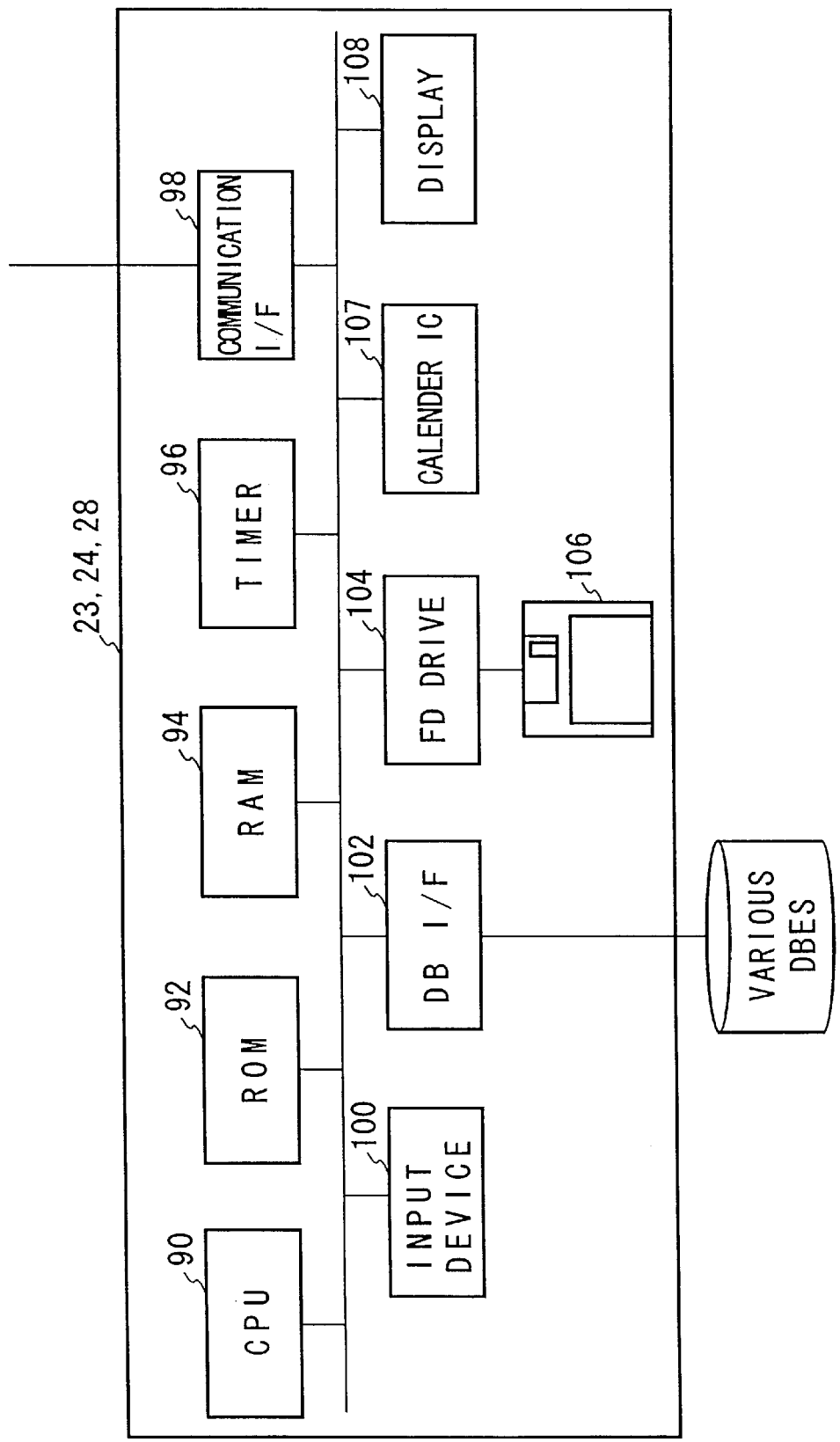
FIG. 3 is a block diagram showing the structure of the connection manager 23 and the message distributor 28.

FIG. 3 is a block diagram showing a hardware arrangement of the connection manager 23, message manager 24 and the message distributor 28, shown in FIG. 1. A CPU 90 executes programs stored in a ROM 92 and a RAM 94. Timer 96 counts predetermined periods. The communication interface 98 processes inputs and outputs to and from an outside communication line. The message distributor 28 may include two of the communication interfaces 98 for connecting with the message provider 30 and the information provider 20, respectively. A user inputs data through an input device 100. The database interface 102 is used to connect the system to various databases DB stored on storage devices such as, for example, a hard disk. The floppy disk drive 104 reads data and/or a program from a floppy disk 106, and provides it to CPU 90. A calendar IC 107 supplies date and time information to CPU 90. The display 108 displays the communication state, etc., to the operator.

FIG. 4 is an exemplary data base structure for message user database 34. Other structures can be used. The message user database 34 contains records having fields of data constituting a user characteristic profile of each user. The fields of data correspond to individual user characteristics, such as message user ID, message user password, provider ID for identifying each information provider 20, provider user ID, information display time, birth date, gender, marital status, occupation, address, name, drinking permitted status, etc. Fields of data can be added and modified as needed. For example, a characteristic "smoking" indicating whether or not a user smokes has been newly added to a field 35. A last communication date when a user last communicated with the message distributor and the item revision time when the new field was last added to the database are recorded in the message user database 34.

Each user inputs his or her characteristics via terminal 10 when using a message viewer 76 (see FIG. 6) for receiving information from the message manager 24 for the first time, or when installing the message viewer program in the terminal 10. Terminal 10 transfers inputted characteristics to the information provider 20, while storing the characteristics locally on hard disk drive 50. The information provider 20 transfers the received information to the message distributor 28 which stores the characteristics in the message user database 34. The characteristics may contain age, occupation category, income, hobby, etc.

FIG. 5 shows one possible arrangement of transmittal condition database 36. The transmittal condition database 36 stores message URLs for identifying each message together with transmittal conditions associated with that message. The transmittal conditions include limitation of display frequency for each user, limitation of display frequency for the overall users, display time, range of the age to be displayed, gender, marital status, occupation, address, whether the user drinks alcoholic beverages or not, etc. New search items can be added to the transmittal condition database 36, as necessary. In this embodiment, a newly added field 37 contains information indicating whether or not. The message distributor 28 searches for the URLs of messages, in response to the request from the terminal 10, based on the user's Characteristics, and transmits the URLs of identified messages to terminal 10. After receiving the URLs, messages matching the URLs and which are therefore appropriate for the user can be sent to terminal 10.

Figure 6:
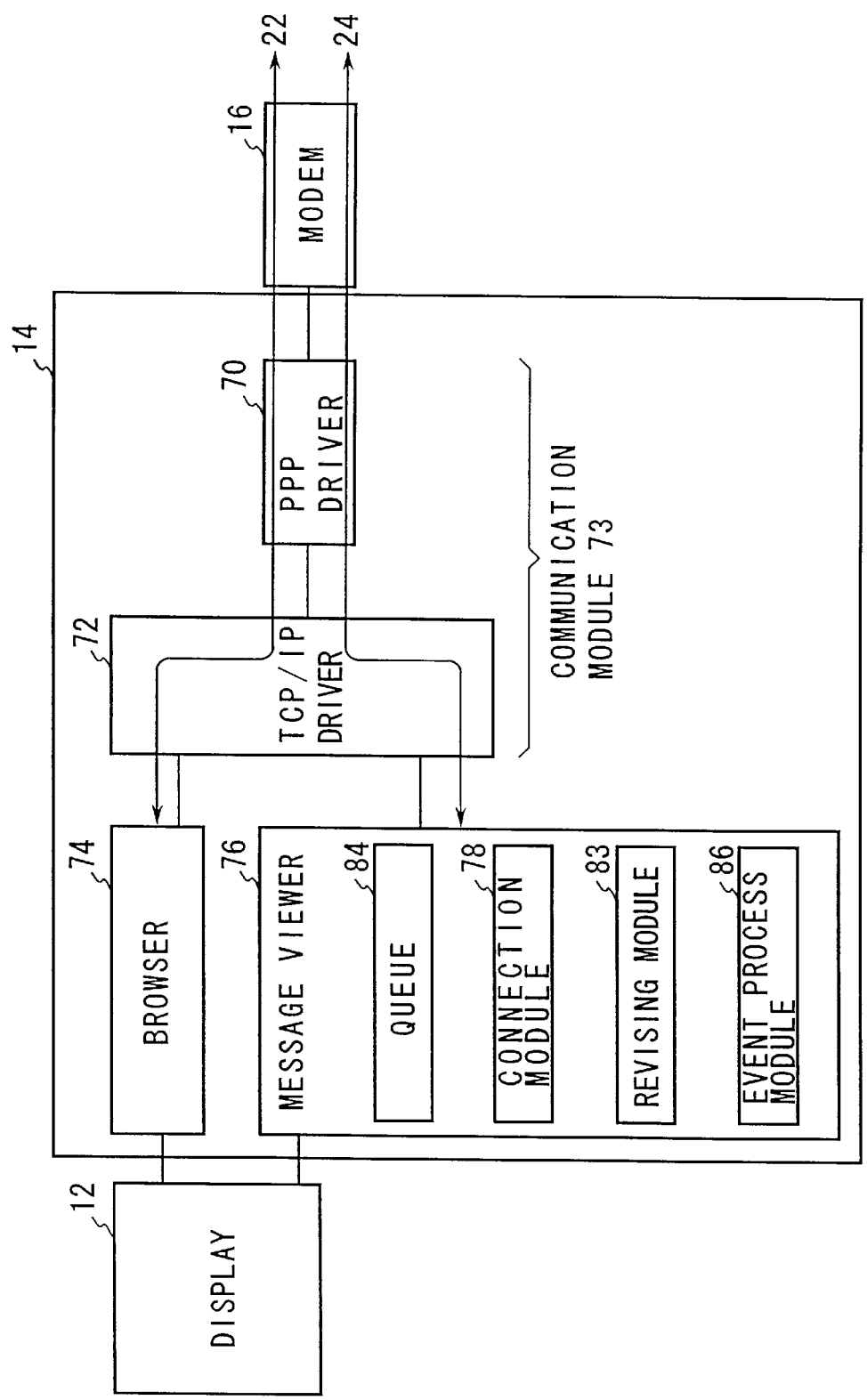
FIG. 6 is a block diagram showing a functional structure of the software executed by CPU 40 of the main body 14.

FIG. 6 shows the functional structure of software executed by CPU 40 of main body 14. The software is stored in storage medium, such as a CD-ROM 58 or floppy disk 56, which is provided to each user. The software can be stored in either non-compressed or compressed form. The software is installed into the hard disk drive 50 from the recording medium. At this time, message viewer location information is also stored on the hard disk drive 50. The message viewer location information represents the location of the message viewer 76 on the hard disk drive 50. The software stored in the hard disk drive 50 is read out in the RAM 44 and is executed by CPU 40.

The software which is supplied to the user for installation on hard disk drive 50 comprises a communication module 73 having a PPP driver 70 and a TCP/IP driver 72, a browser 74, and a message viewer 76, as a functional structure. The PPP driver 70 creates a data link with public network gateway 19. The browser 74 communicates with the Internet gateway 22 through the TCP/IP driver 72 on the data link created by the PPP driver 70. The message viewer 76 communicates with the message manager 24 through the TCP/IP driver 72 on the data link created by the PPP driver 70. The message viewer 76 has a connection module 78, a revising module 83 and an event process module 86 for updating (revising) the characteristics, and a queue 84 for storing the URL received from the message distributor 28. The queue 84 is generated in the RAM 44.

Figure 7:
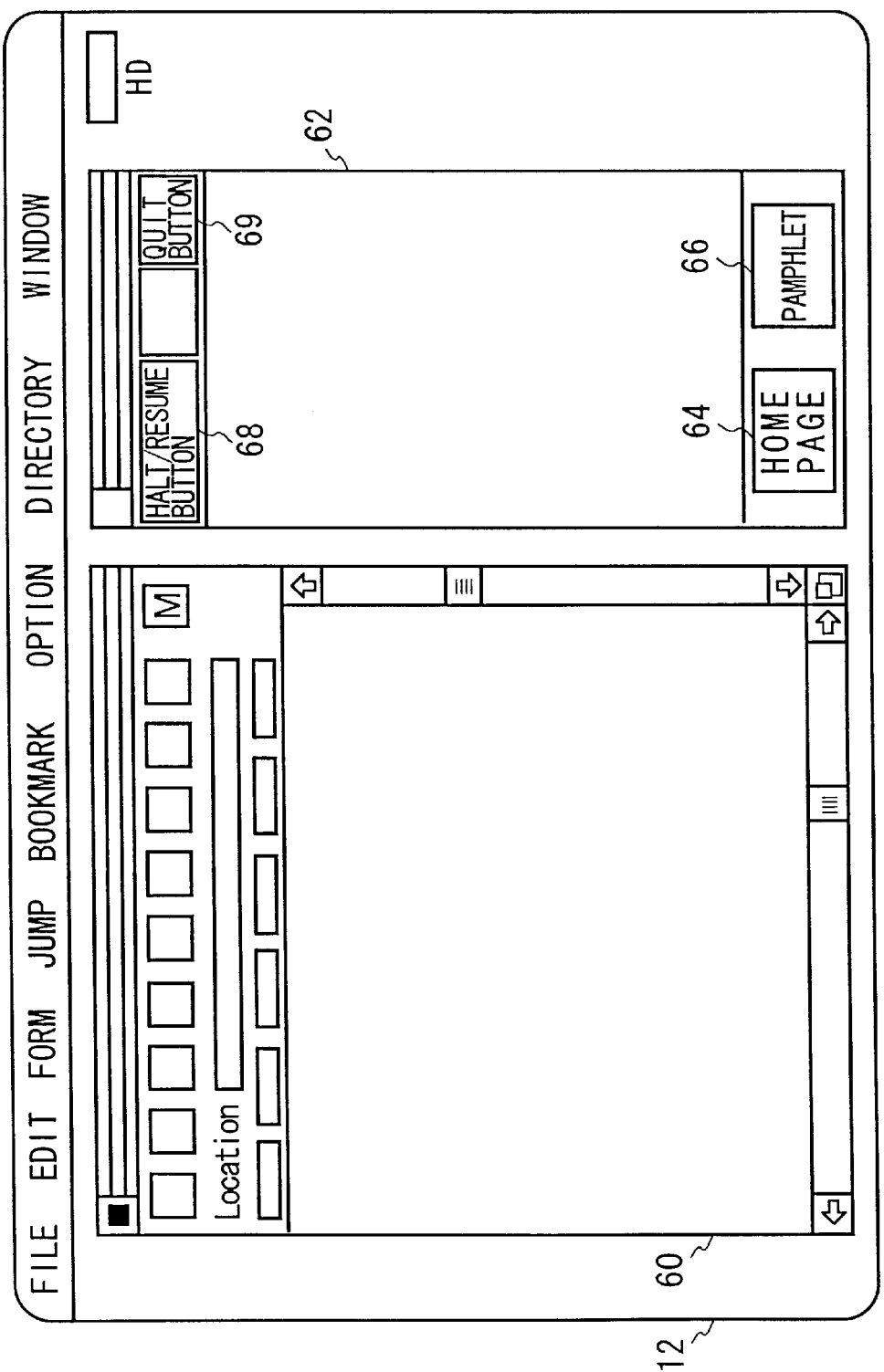
FIG. 7 illustrates a screen display of the display 12.

FIG. 7 is an example of a screen displayed on display 12. Two windows open on the display 12. One is a browser window 60 for displaying images found by browser 74. Browser window 60 displays information received from the Internet 32. Suitable examples of the browser 74 include Netscape (trademark) and Mosaic (trademark). The other window is a message viewer window 62 for displaying messages from message viewer 76.

Message viewer window 62 displays a home page button 64, information request button 66, halt/resume button 68 and quit button 69. The window displays messages received from information providers 20. When the home page button 64 is clicked, the home page which corresponds to the message being displayed in message viewer window 62 is displayed in the browser window 60. When the information request button 66 is selected, material which corresponds to the message being displayed on the message viewer window 62 is transmitted to the user.

The message viewer window 62 displays a new message every predetermined period (e.g., every one minute). When the message can be displayed, the halt/resume button 68 indicates "halt". If the halt/resume button 68 is selected in this situation, message transmission is interrupted. When a message is not being displayed, the halt/resume button 68 indicates "resume". If the halt/resume button 68 is selected in this situation, message transmission begins again. Selecting the quit button 69 causes the message viewer to finish communication with the message manager 24.

Figure 8:
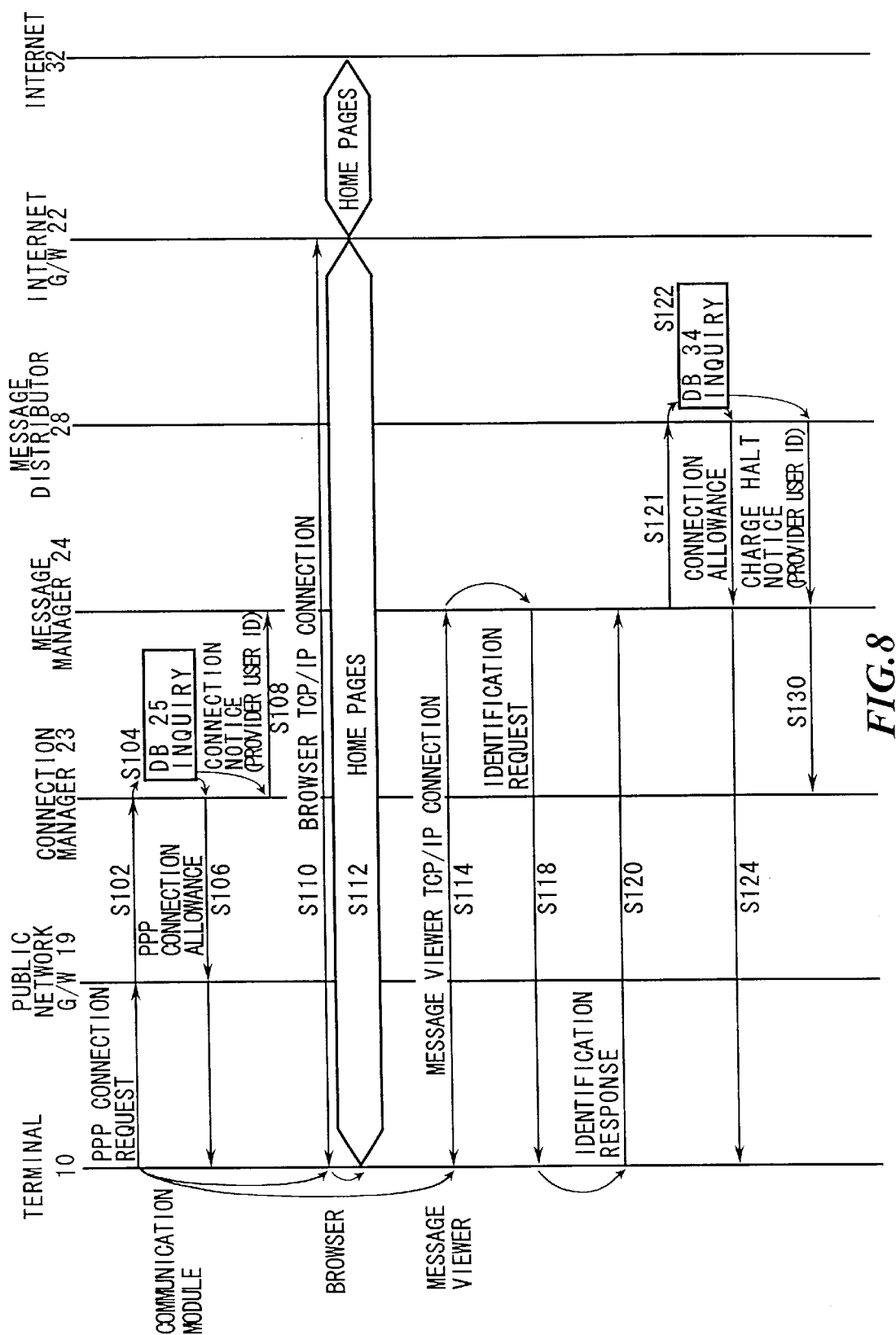
FIG. 8 is a diagram showing the connection sequence of the terminal 10, message manager 24, etc.

FIG. 8 explains the connection sequence among the terminal 10, public network gateway 19, connection manager 23, message manager 24, message distributor 28, the Internet gateway 22 and the Internet 32. When the communication module 73 of the terminal 10 generates a PPP connection request (S102), the connection manager 23 verifies whether the provider user ID and the password of the user who requested connection, are registered, by checking the provider user database 25 (S104).

If the ID and the password are registered, the connection manager 23 transmits a PPP connection permission to the terminal 10 (S106), while sending the provider user ID to the message manager 24 together with the corresponding port number of the PPP connection. The message manager 24 stores the provider user ID and the corresponding port number of the PPP connection in the RAM 94.

Once the PPP connection is allowed, a TCP/IP connection is established between the browser 74 of the terminal 10 to the Internet gateway 22 (S110), and browser 74 can communicate with the Internet 32 through the Internet gateway 22 (S112). The message viewer 76 of the terminal 10 is TCP/IP connected to the message manager 24 (S114). Then, the message manager 24 requests verification to the message viewer 76 of the terminal 10 (S118).

When the message viewer 76 receives the verification request, the message viewer 76 transmits the message user ID and the password to the message manager 24 (S120). The message manager 24 reads from the RAM 44 the provider user ID which has been associated with the port number of the PPP connection used by the user, and transmits the provider user ID to the message distributor 28, together with the provider ID for identifying the provider, the message user ID and the password (S121).

The message distributor 28 checks the message user DB 34 to verify whether the received message user ID and the message user password are registered in the message user DB 34 (S122). If they are registered, the message distributor 28 transmits a connection permission to the message viewer 76 (S124). Then, message distributor 28 notifies the connection manager 23 to stop charging the user who has a provider user ID, which has been received at S121 (S130).

Figure 9:
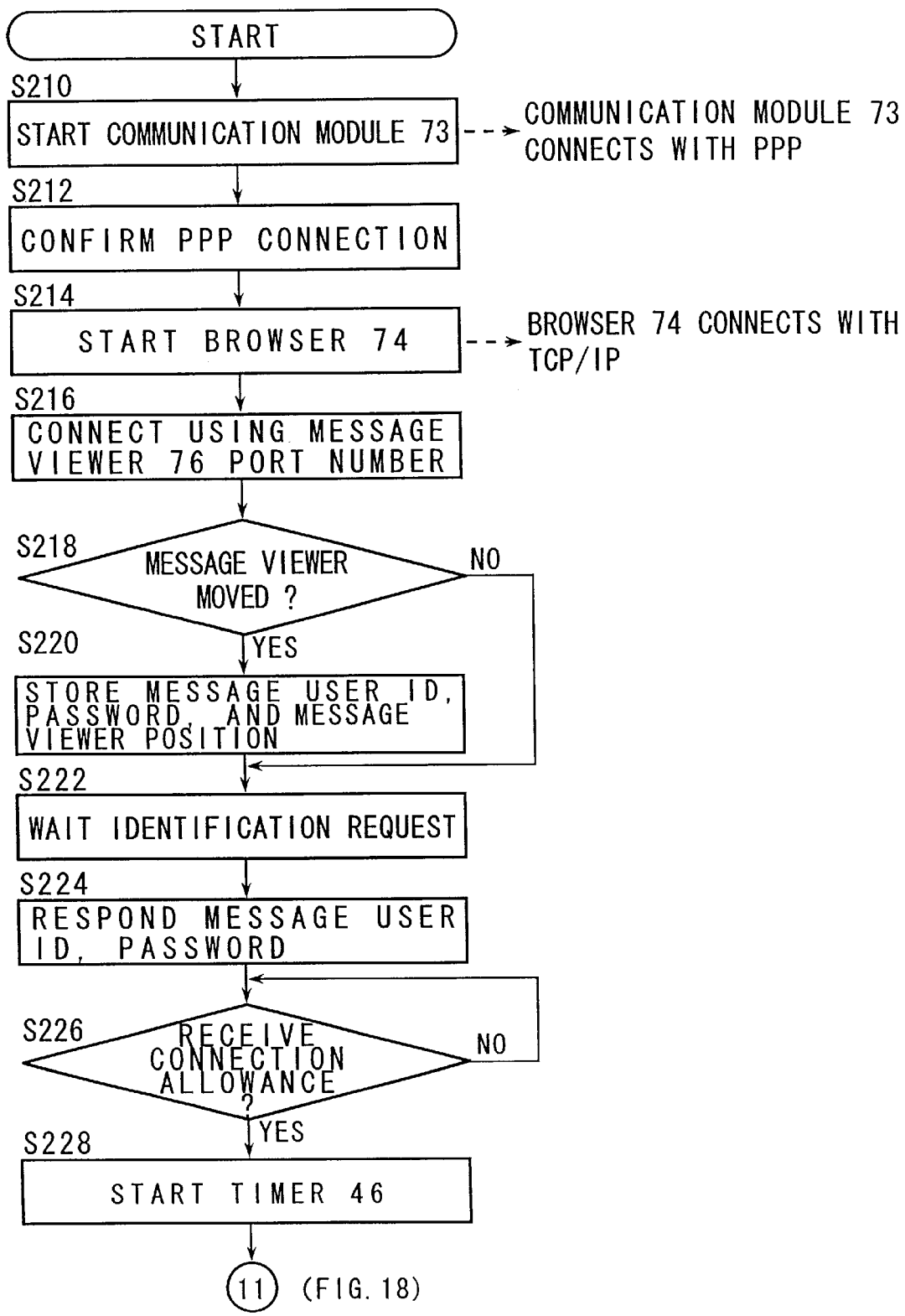
FIG. 9 is a flowchart showing a connection process of the terminal 10.

The details of operations generally shown in FIG. 8 will be explained in greater detail with reference to FIGS. 9 through 13. FIG. 9 shows an operation flow of the connection module 78 of the message viewer 76. The connection module 78 starts the communication module 73 (S210). This causes the communication module 73 to connect using PPP with the public network gateway 19 using the provider user ID and the provider user password. Having confirmed a PPP connection (S212), the connection module 78 starts the browser 74 (S214) to cause a TCP/IP connection between the browser 74 and the Internet gateway 22. Then, the connection module 78 is TCP/IP connected with the message manager 24 using a unique TCP/IP port number of the message viewer 76 (S216).

Since independent communication links are formed between the browser 74 and the Internet gateway 22, and between the message viewer 76 and the message manager 24 based on the two different TCP/IP port numbers, communication via these two separate paths occurs independently of each other. This allows the message viewer 76 to display a message without losing any essential browser functionality.

Next, the message viewer 76 compares the message viewer position information with the position of the message viewer 76 (S218). If these two agree with each other, the message viewer 76 waits for a verification request from the message manager 24 (S222). Verification, that is, the message user ID and the password are given to the message viewer 76 by the message distributor 28 at the first communication with message distributor 28, and are stored in hard disk drive 50. When message viewer 76 receives the verification request from the message manager 24, the message viewer 76 reads out the message user ID and the password from the hard disk drive 50 and transmits them to the message distributor 28 (S224).

If, at S218, the message viewer position information does not agree with the actual position where the message viewer 76 is stored, there is a high possibility that the message viewer 76 has been copied to the other computer. Therefore, the user is requested to input the message user ID and the password again (S220). The newly inputted message user ID and the password are stored in the hard disk drive 50, together with the new message viewer position information which indicates the new position of the message viewer.

Figure 18:
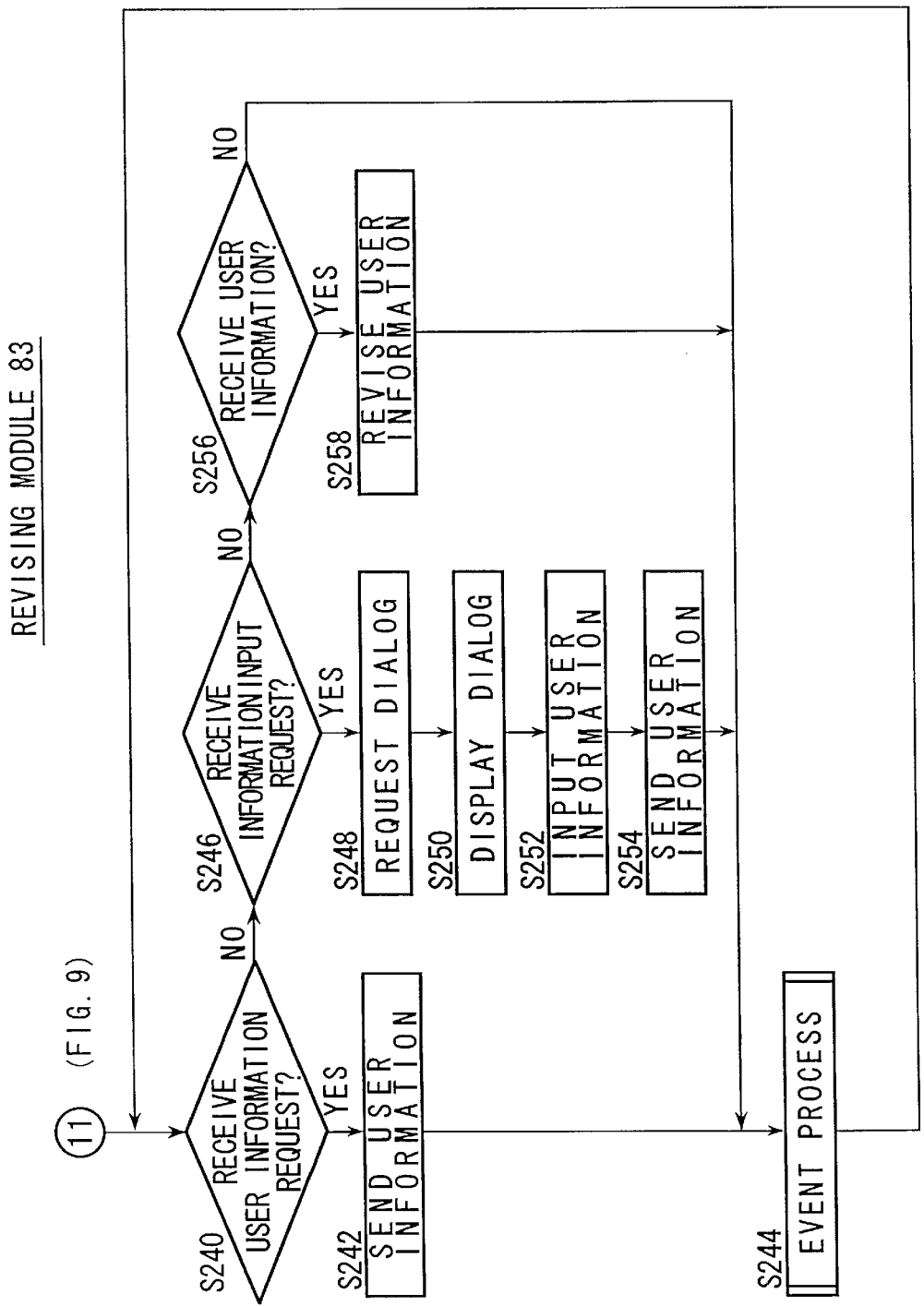
FIG. 18 is a flowchart showing the characteristics revising process of the message viewer 76.

Then, the message viewer 76 waits for a request from the message manager 24 (S222), and transmits the message user ID and the password stored in the hard disk drive 50 (S224). This ensures that the message user ID of the genuine user can be transmitted to the message manager 24 even if the message viewer 76 is copied to the other computer. Once the message viewer 76 receives permission from the message manager 24 (S226), the message viewer 76 starts the timer 46 (S228) and starts to carry out a characteristics revising process (FIG. 18).

Figure 10:
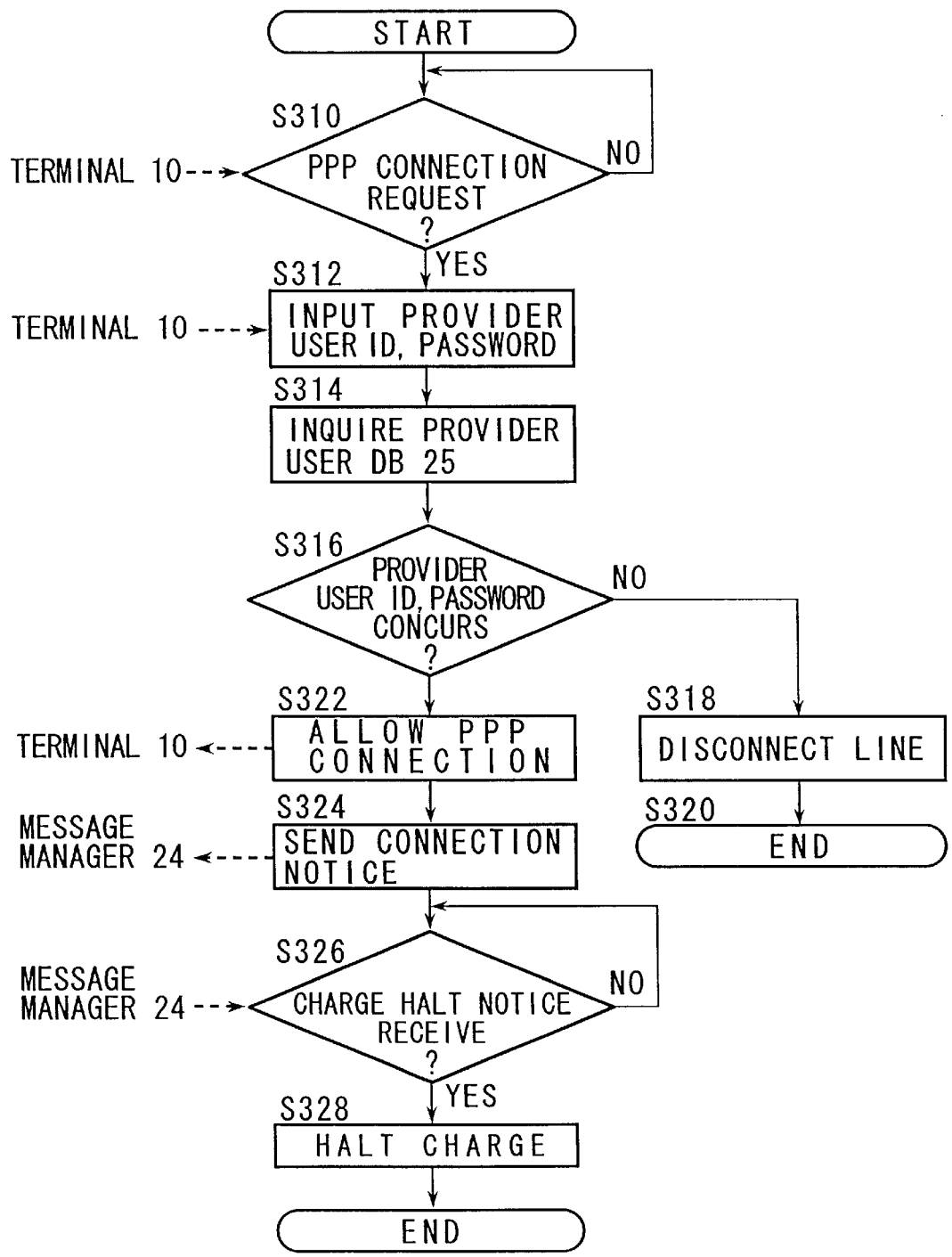
FIG. 10 is a flowchart showing a message request action of the connection manager 23.

FIG. 10 shows an operation flow of the connection manager 23 in the connection sequence shown in FIG. 8. When a PPP connection is requested through the public network gateway 19 from the terminal 10 (S310), the connection manager 23 requests the provider user ID and the password to the terminal 10 (S312). Upon receiving the provider user ID and the password, the connection manager 23 checks the provider user database 25 to verify whether the provider user ID and the password are registered (S314).

As shown in FIG. 11, the provider user database 25 stores provider user ID, provider user password, the total amount of chargeable time so far, and chargeable amount for each provider user. If the received provider user ID and the provider user password are not registered in the provider user database 25, the connection manager 23 disconnects the line (FIG. 10, S318) and the process concludes (S320). If the provider user ID and the password are registered in the provider user database 25, the connection manager 23 permits the terminal 10 a PPP connection (S322) and transmits a connection notice to the message manager 24 (S324). Then, the connection manager 23 waits for a charge stop notice from the message distributor 28 (S326). Upon receiving the notice, the connection manager 23 stops charging the provider user (S328).

Figure 12:
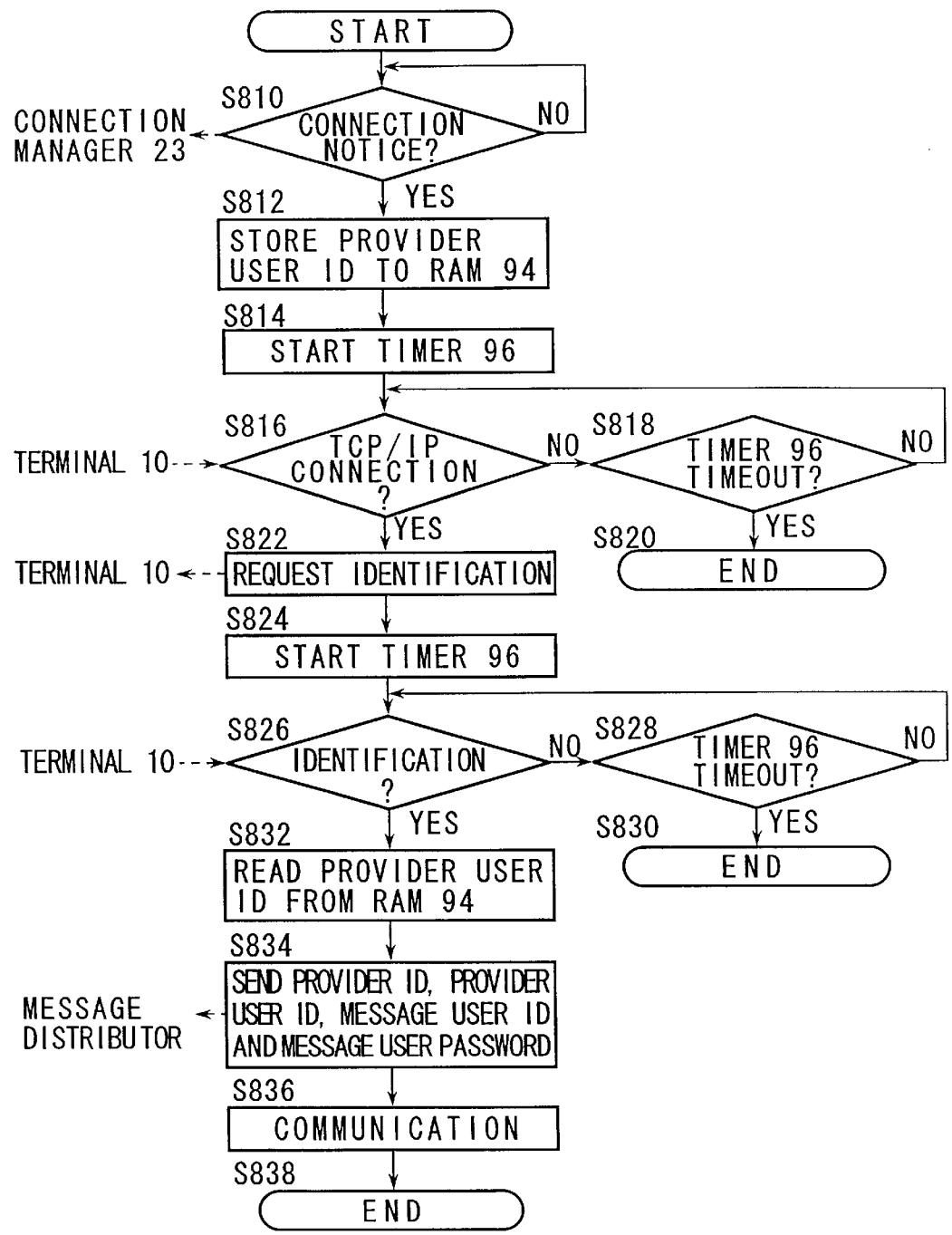
FIG. 12 is a flowchart showing a connection process of the message manager 28.

FIG. 12 shows a operation flow of the message manager 24 in the connection sequence shown in FIG. 8. Upon receiving the connection notice from the connection manager 23 (S810), the message manager 24 records the received provider user ID in the RAM 94 (S812). The message manager 24 starts the timer 96 (S814) to determine whether the timer 96 has been TCP/IP connected with the message manager 24 (S816). If the TCP/IP connection is not established, the message manager 24 waits (S816, S818). If the timer 96 is up (S818), the process concludes (S820).

If, at S816, it is determined that the TCP/IP connection has been completed, the message manager 24 requests verification to the message viewer 76 (S822). The message manager 24 resets the timer 96 to start counting again (S824). If the timer 96 is up before the message manager 24 receives the verification (S828), the process concludes (S830). If the message manager 24 receives the verification (S826), the message manager 24 reads out the provider user ID from the RAM 94 (S832) and transmits it to the message distributor 28 together with the provider ID for identifying this provider, the message user ID and the message user password which were received from the message viewer 76 (S834). Then, the communication starts between the message viewer 76 and the message distributor 28 through the message manager 24 (S836).

Figure 13:
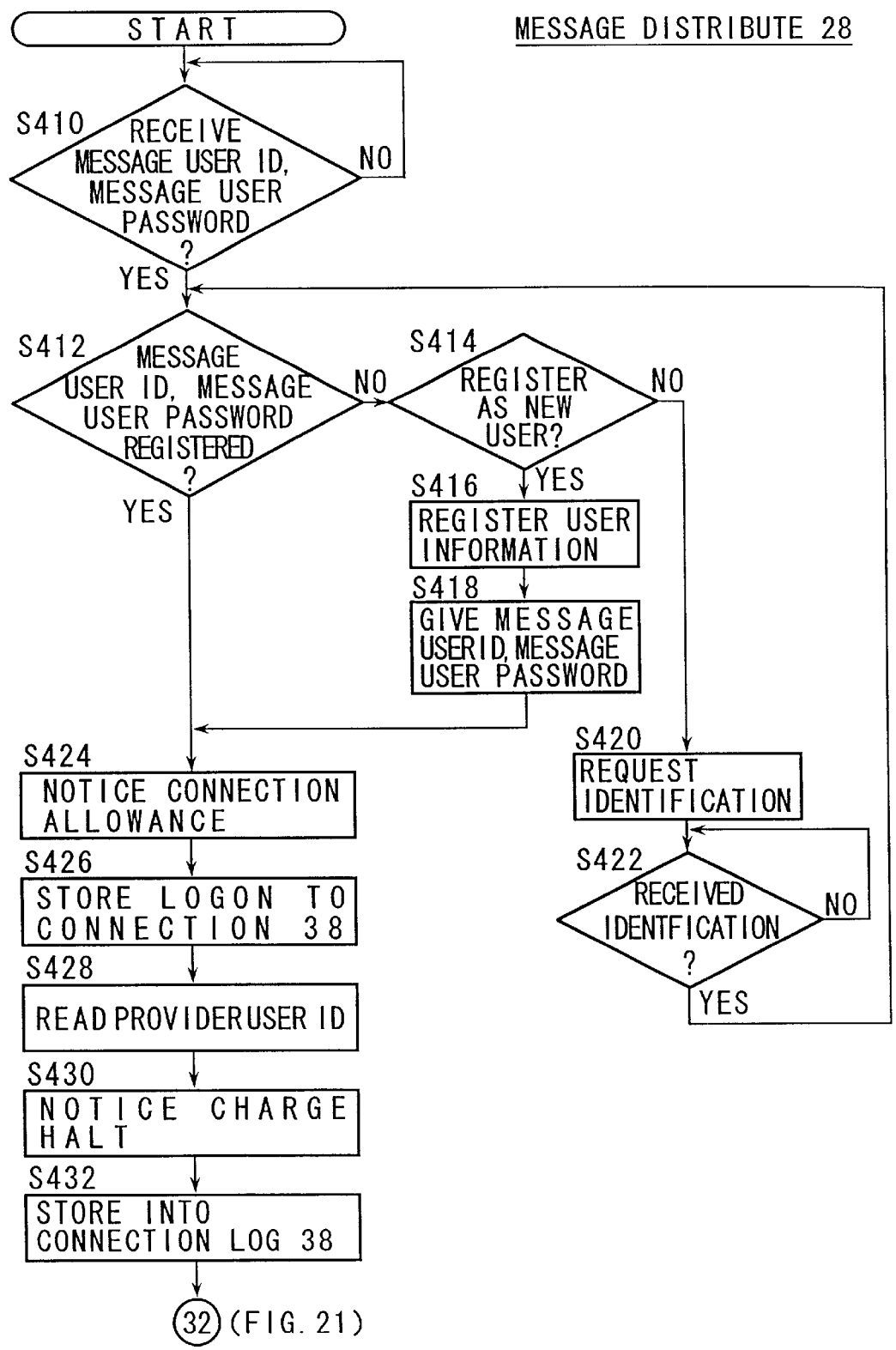
FIG. 13 is a flowchart showing a connection process of the message distributor 38.

FIG. 13 shows an operation flow of the message distributor 28 in the connection sequence shown in FIG. 8. Upon receiving the message user ID and the password from the message manager 24 (S410), the message distributor 28 checks the message user database 34 (FIG. 4) to determine if they are registered (S412). If the user is not registered, the message distributor 28 sends an inquiry to the message viewer 76 asking whether the user is registering as a new user (S414). If new user registration is requested, the message distributor 28 receives a characteristics form the message viewer 76 and stores the information in the message user database 34. The message distributor 28 also gives the user the message user ID and the message user password (S418).

If registration is not requested (S414), the message distributor 28 requests verification to the message viewer 76 (S420) and waits until receiving the verification (S422). Then operation returns to S412. Upon receiving the verification, the process returns to S412 and proceeds to S424. At S424, connection permission is generated, and a 'log on' is recorded in the connection log 38 (S426).

The message distributor 28 reads the provider ID and the provider user ID which have been received form the message manager 24 (S428) and instructs the provider defined by the provider ID to stop charging the user who is defined by the provider user ID (S430). This event is recorded in the connection log 38 (S432). Since message user ID and provider user ID are independently provided, charging can be stopped only on the provider ID that is in use, even if a single message user has a plurality of providers (or provider user IDs). The connection manager 23 stops charging the user who is defined by the provider user ID. In other words, the connection manager 23 maintains access to the Internet 32 without charge.

FIG. 14 shows an example of a connection log 38. Provider ID, event (log on, charge stop, etc.), event occurrence time are recorded in the connection log for each provider user ID. The connection fee to the provider during the charge stop period is paid by the owner of the message distribution system 39. Therefore, the provider user can access the Internet only on condition that the user watches the message.

The example shown in FIG. 14 indicates that charge on the provider user XXX was stopped after log on. The message distributor 28 detects the charge stop period based on the connection log 38 to pay the fee which corresponds to the detected period to the provider. The message distributor 28 charges the message provider 30 for the service of displaying the message on the message viewer 76.

Figure 15:
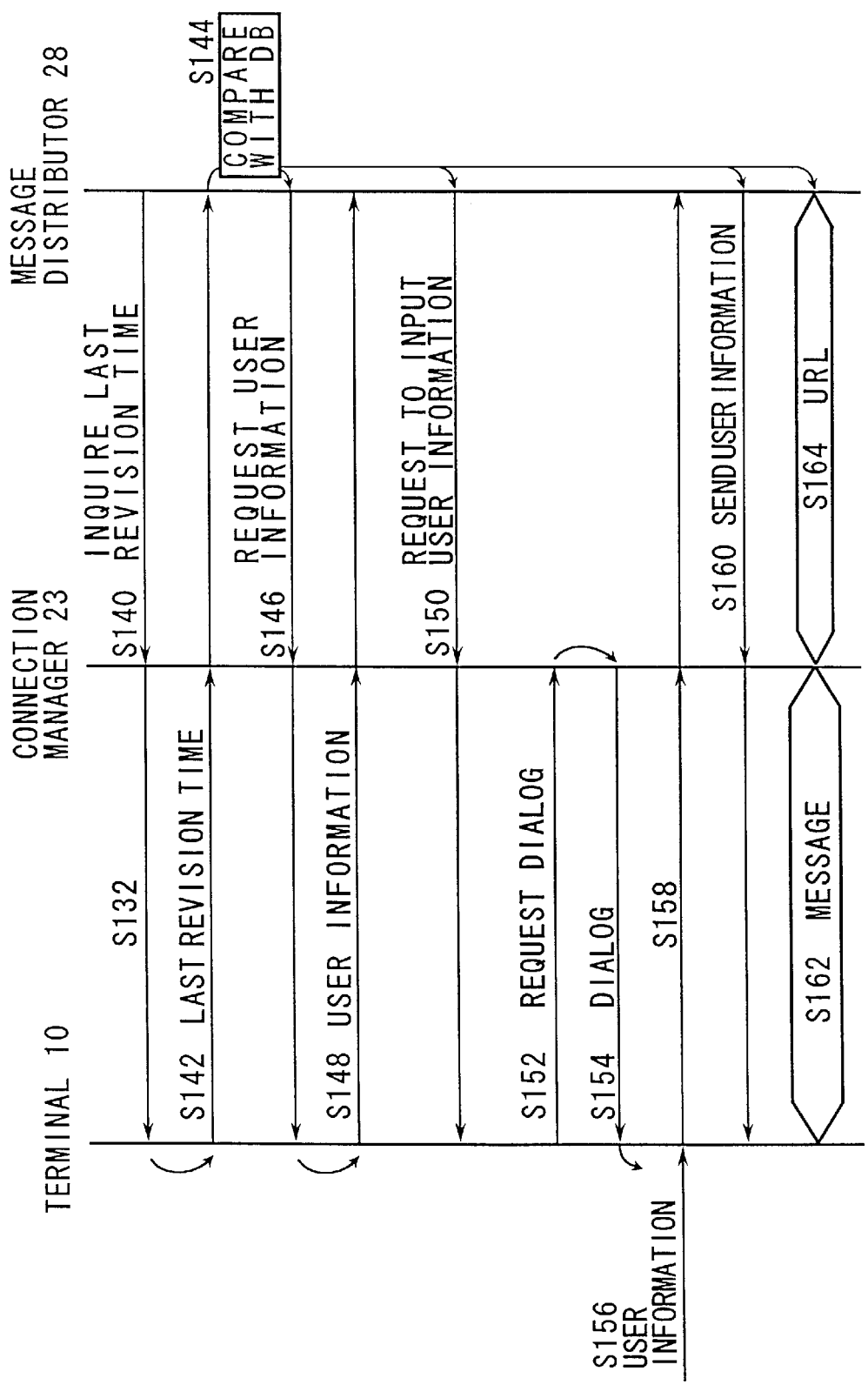
FIG. 15 is a diagram showing the characteristics revising sequence in the first embodiment.

FIG. 15 explains the communication sequence of terminal 10, the message manager 24 and the message distributor 28 after the message distributor 28 permits the connection of terminal 10. The message distributor 28 checks the terminal 10 to inquire the last revision date and time (hereinafter, referred to simply as revision time) of the characteristics 49 of the terminal 10 (S140). When the message distributor 28 receives the last revision time and time of the characteristics from the terminal 10 (S142), the message distributor 28 determines if it is necessary to revise the characteristics, based on the last revision time and on the data stored in the message user database 34 (S144).

If it is determined that the characteristics 49 of the terminal 10 needs to be revised, the message distributor 28 requests the terminal 10 to transmit the characteristics (S146), and the terminal 10 transmits the characteristics in response to the request. If it is necessary to revise both the characteristics 49 and characteristics stored in the message user database 34, the message distributor 28 requests the terminal 10 to input the characteristics (S150).

Terminal 10 requests the dialog for revising the characteristics from the connection manager 23 (S152), downloads the dialog (S154), and displays on the display 12. Characteristics input by the user (S156) are transmitted to the message distributor 28 (S158). Then, the message distributor 28 registers the characteristics in the message user database 34, and send it back to the terminal 10 (S160). Once the characteristics of the message distributor 28 and the terminal 10 have been revised, communication starts (S162, S164).

Figure 16:
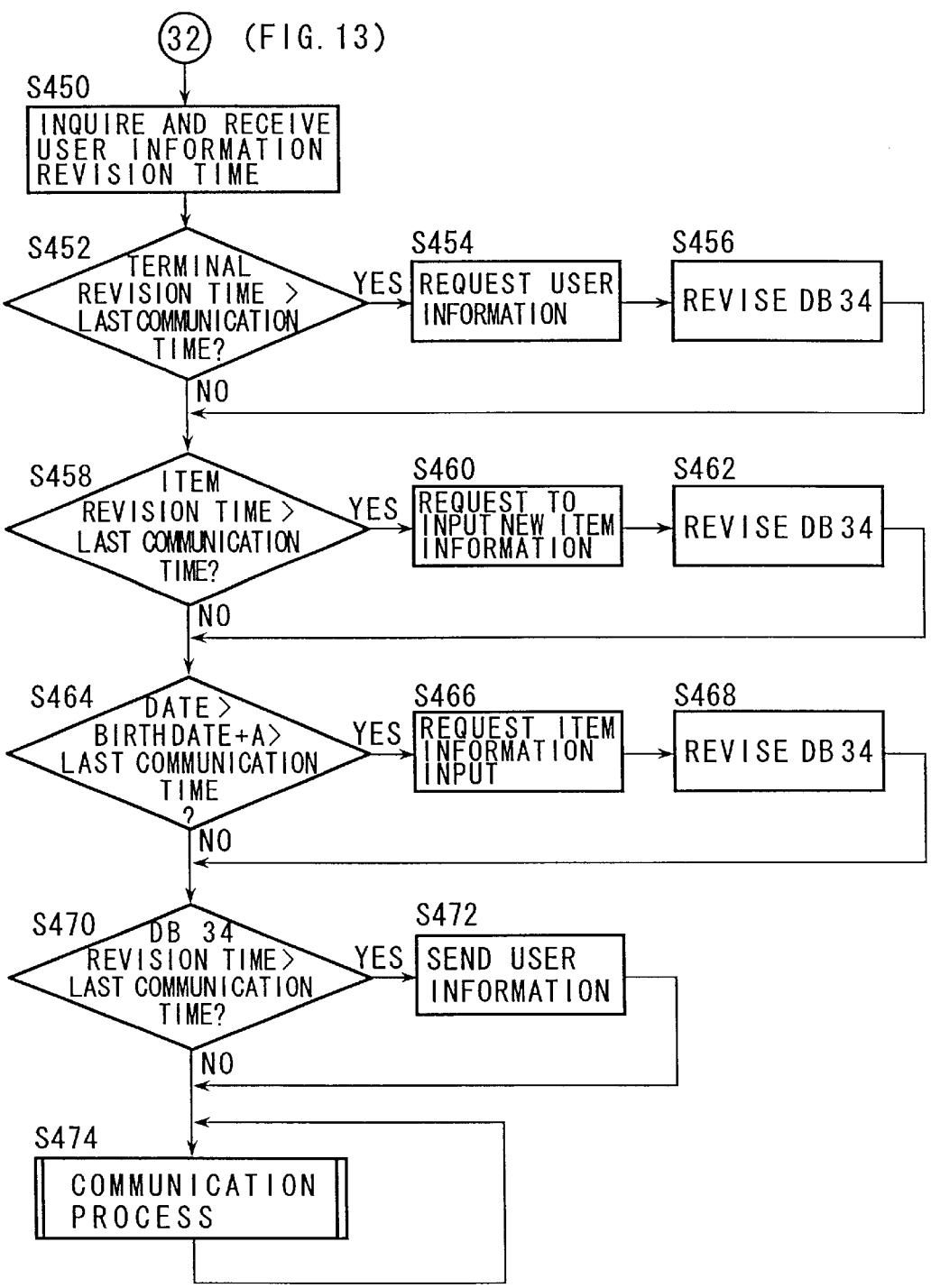
FIG. 16 is a flowchart showing the characteristics revising process of the message distributor 28.

FIG. 16 shows the detailed operation of the message distributor 28 in the communication sequence shown in FIG. 15. The message distributor 28 inquires and receives the revision time of the characteristics of the terminal 10 (S450). Then, the message distributor 28 compares the received revision information with the last communication date between the message user database 34 and the user (S452).

If the characteristics revision time of the terminal 10 is later than the last communication date, the characteristics 49 of the terminal 10 have been revised. Then, the message distributor 28 requests the characteristics 49 (S454). The message distributor 28 revise the message user database 34 based on the received characteristics (S456).

The last communication date with the message user is further compared with the item revision time of the message user database 34. For example, if an additional field, euch as field 35 (see FIG. 4) has been added to the message user database 34, all users are required to input data to the new field 35. If the database item revision time is later than the last communication date, the characteristics have not been revised. Then, the message distributor 28 requests through the terminal 10 new characteristics from the message user in connection with the newly added item (S460). When new information is input by the user, the message user database 34 is revised (S462).

Then, comparison is made among the current date, the date which is obtained by adding a predetermined value to the birth date, and the last communication date (S464). If the birth date plus predetermined value is before the current date and after the last communication date, the message distributor 28 requests the user to input information about a certain item which is associated with the predetermined value (S466). Predetermined value is, for example, 20 years, which means that the user reaches his majority. The associated item may an indicator of whether or not the user smokes. In this case, if the user became twenty years old between the current date and the last communication date, the message distributor 28 requests the user to input information as to whether the user smokes at S466. When the characteristics have been received from the terminal 10, the message user database 34 is revised (S468).

The message distributor 28 compares the revision time of the characteristics 49 with the last communication date with the user of the message user database 34 (S470). If the revision time of the characteristics of the terminal 10 is before the last communication date, there is a possibility that the message user database 34 has been revised by accessing from a different terminal other than the user's terminal. In order to revise the characteristics of the terminal 10, the message characteristics stored in the message user database 34 are transmitted to the terminal 10 (S472). Thus, the revision of the characteristics is completed, and the communication process starts (S474).

Figure 17:
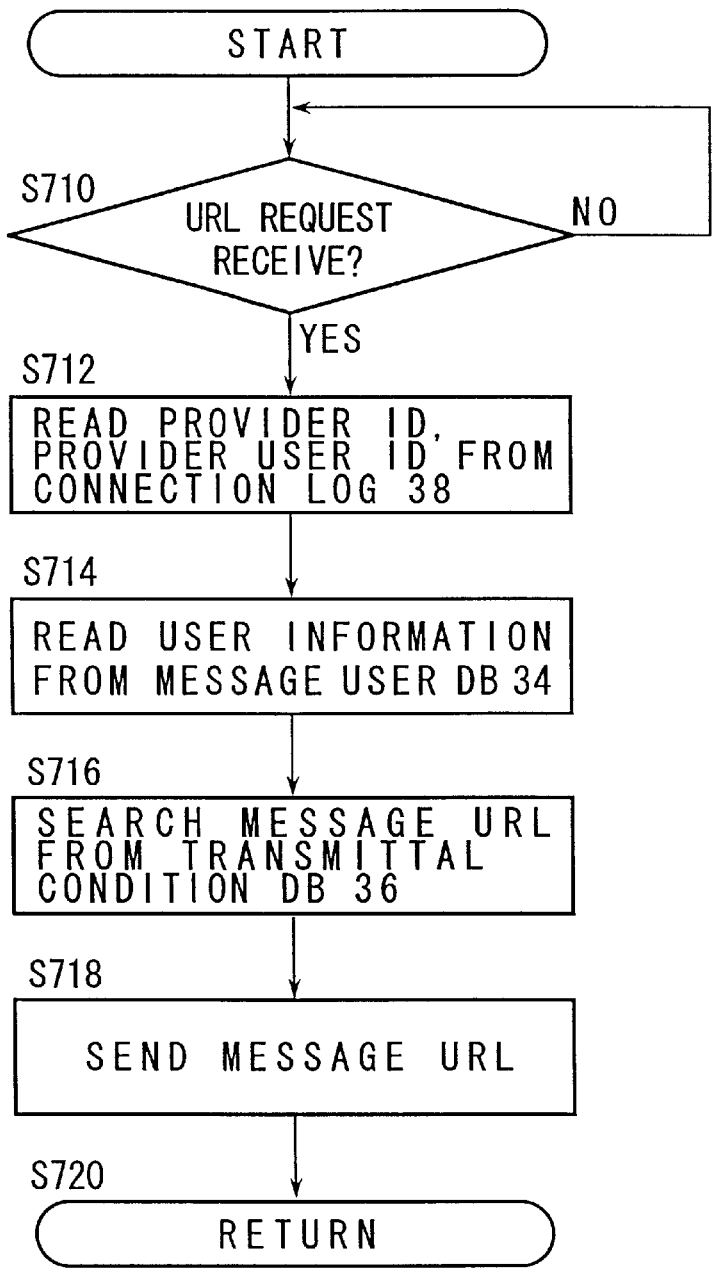
FIG. 17 is a flowchart showing details of the communication processing step of FIG. 16.

FIG. 17 shows details of the communication process of the message distributor 28 (S474). Upon receiving a message request (URL request) from the terminal 10 (S710), the message distributor 28 searches and reads out the provider ID and the provider user ID from the connection log 38 using the TCP/IP number which is now URL-requested (S712).

Then, the message distributor 28 searches and reads out the characteristics from the message user database 34 using the provider ID and the provider user ID (S714). The message distributor 28 further searches a message, which is to be transmitted from transmittal condition database 36 in the message user database 34 and reads out the URL using the characteristics (S716). Then, the message distributor 28 230 transmits the URL read out from the message user database 34 to the terminal 10 and the process returns to FIG. 16 (S720).

FIG. 18 shows in greater detail the operations of the message viewer 76 in the communication sequence of FIG. 15. When the message viewer 76 receives a request for characteristics (S240), it reads the characteristics 49 from the hard disk drive 50 and transmits them (S242). When the message viewer 76 receives an input request of characteristics (S246), the message viewer 76 requests the message manager 24 to transmit a dialog screen for enabling the user to input the characteristics (S248). The message manager 24 transmits the dialog screen in response to the request. The message viewer 76 downloads the dialog (S248) to display on the display 12 (S250).

When the user inputs the characteristics (S252), the message viewer 76 transmits the characteristics to the message distributor 28 (S254). When the message distributor 28 receives the characteristics (S256), the message distributor 28 revises the characteristics 49 stored in the hard disk drive 50 (S258). If neither the characteristics request, characteristics input request, nor characteristics is received, or if S242, S254, or S258 is finished, event processing is executed (9244) and the process returns to S240.

Figure 19:
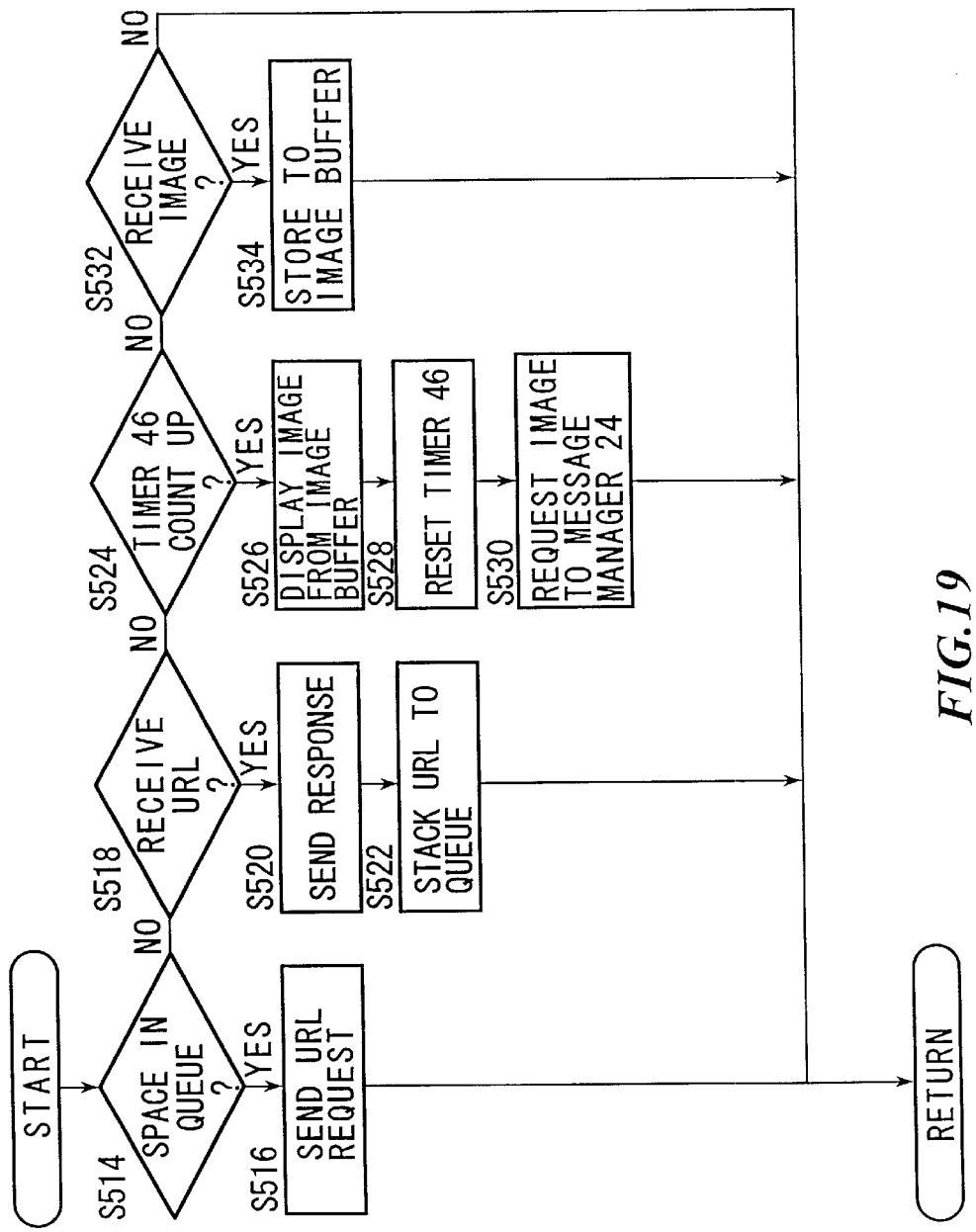
FIG. 19 is a flowchart showing details of the event processing step of FIG. 18.

FIG. 19 shows details of the event processing (S244) of FIG. 18. This operation is executed by the event process module 86 of the message viewer 76. If there is a predetermined number or more of empty places in the queue 84 (S514), the event process module 86 transmits a URL request (S516). This allows the terminal 10 to receive-URLs of the message that the message distributor found during a search. Upon receiving URL 0 (S518), the terminal 10 transmits a receipt response (S520) and loads the URL in the queue 84 (S522). When the timer 46 counts up (S524), the image stored in the image buffer is displayed (S526). This allows the URL message searched by the message distributor to be displayed. Next, the timer 46 is reset (S528), and a new image is requested to the message manager 24 using the URL loaded at the head of the queue 84 (S530). When the image is received from the message manager (S532), the received image is stored in the image buffer (S534). Storing the image in the image buffer in advance can reduce the time taken for revising the image.

Second Embodiment

Figure 20:
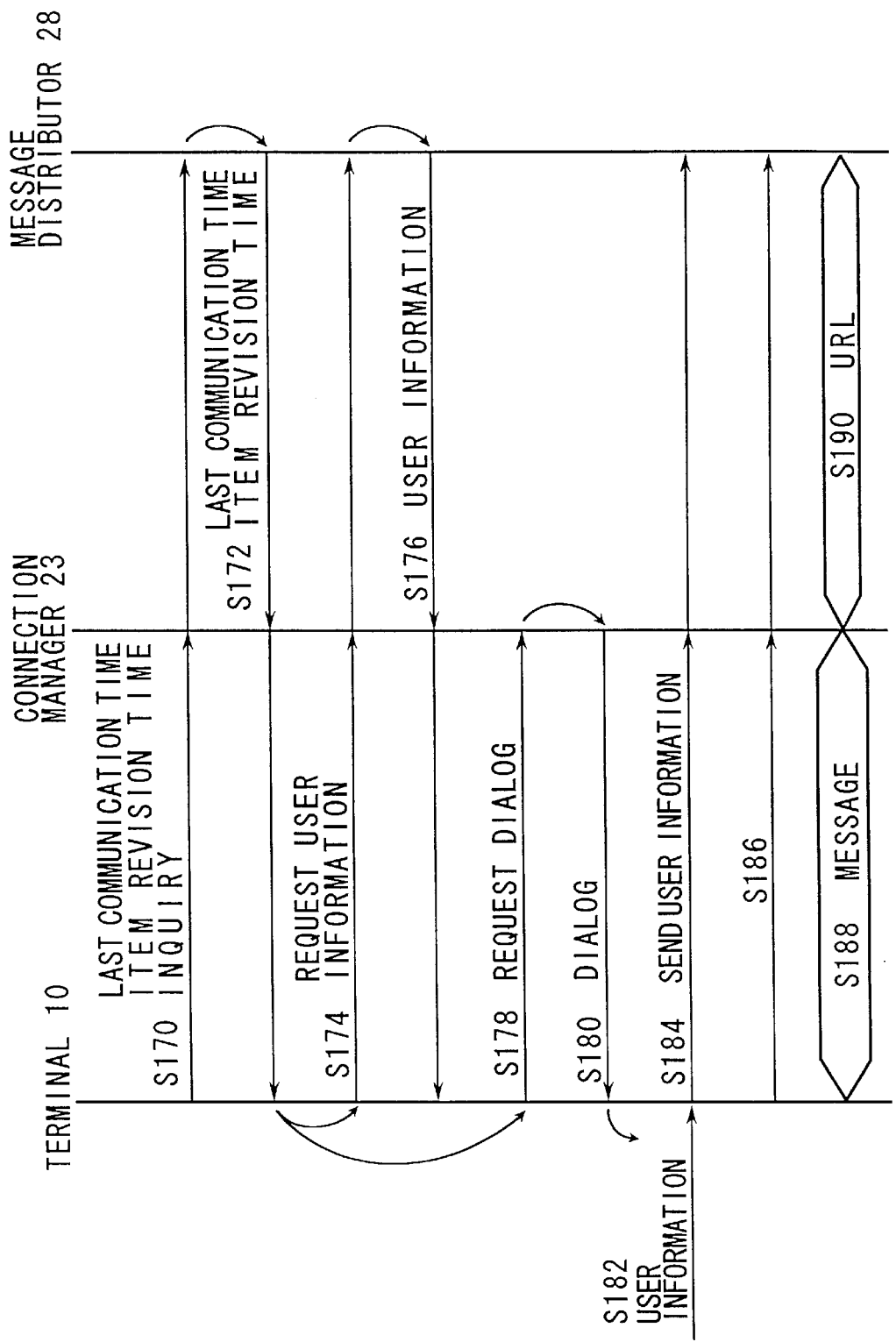
FIG. 20 is a diagram showing the characteristics revising sequence of a second embodiment of the invention.

FIG. 20 shows the characteristics revision sequence in accordance with the second embodiment. In the first embodiment, the message distributor 28 determines the necessity to revise the characteristics. In the second embodiment, the message viewer 76 of the terminal 10 determines the necessity to revise the characteristics. The other structure is the same as that in the first embodiment.

When the message viewer 76 receives a connection permission from the message distributor 28 at S124 of FIG. 8, the message viewer 76 inquires the message distributor 28 about the last communication date with the user and the item revision time in the message user database 34 (S710). The message distributor 28 reads out the provider ID and the provider user ID from the connection log 38 using the TCP/IP port number. The message distributor 28 also reads out the last communication date from the message user database 34 using the provider ID and the provider user ID, and transmits it together with the item revision time to the terminal 10 (S172).

The message viewer 76 of the terminal 10 compares the received last communication date with the last revising date 47 of the characteristics 49. If the last communication date is after the last revising date 47, there is a possibility that the message user database 34 has been revised by accessing from the other terminal. Then, the message viewer 76 requests the message distributor 28 to transmit the characteristics (S174). Then, the message distributor 28 reads out the characteristics in the same manner as reading of the last communication date, and transmits the characteristics to the terminal 10 (S176). Upon receiving the characteristics, the message viewer 76 of the terminal 10 revises the characteristics 49 stored in the hard disk drive 50.

Then, the message viewer 76 compares the item revision time received from the message distributor 28 with the last communication date. If the item revision time is after the last communication date, that means the message user database 34 does not contain the new item which has been newly added. The terminal 10 requests a dialog for revising the items to the message manager 24 (S178). Upon receiving the dialog from the message manager 24, the terminal 10 displays the dialog on the display 12 (S180). When the user inputs characteristics of the new item (S182), the characteristics 49 in the hard disk drive 50 is revised and the characteristics is transmitted to the message distributor 28 (S184).

If the date obtained by adding a predetermined value to the user's birth date is before the present time and before the last communication date, the terminal 10 request the message manager 24 to send a dialog for adding the new item as characteristics (S178). Upon receiving the dialog from the message manager 24, the terminal 10 displays it on the display 12. For example, if the date obtained by adding 20 years to the user's birth date is between the last communication date and the present time, a dialog for inquiring whether the user smokes is immediately added.

If the last revising date 47 in the characteristics 49 is after the last communication date received from the message distributor 28, that means the characteristics 49 has been revised without communicating with the message distributor 28. In this case, the characteristics 49 is transmitted to the message distributor 28 even though the items in the message user database 34 have not revised yet (S186). Then, the message distributor 28 revises the characteristics of the message user database 34. The message viewer 76 starts communication with the message distributor 28 (S188, S190). According to the embodiment, characteristics can be easily revised similarly to the first embodiment. The lead of the message distributor 28 is reduced compared with the first embodiment.

Third Embodiment

FIG. 21 shows a structure of the message user database 34 in accordance with the third embodiment. In this embodiment, item type field is provided before each user item. The other structure is the same as that of the first embodiment.

As shown in FIG. 22, each type of the items corresponds to each item. Each item type is provided with an attribute, such as date, numeral, character, etc., data range, and the data size (Byte number). The message provider 30 selects an item as message searching condition. The message distributor 28 stores the searching condition of each item following the each item type. A plurality of item types and the associated conditions may be stored while corresponding them to each message.

This embodiment allows a searching condition of a new item to be set merely by revising the characteristics. A new item type can be added without changing the structure of the message user database 34. Searching conditions can be flexibly added or modified in response to various requests from the message provider 30.

Fourth Embodiment

Figure 23:
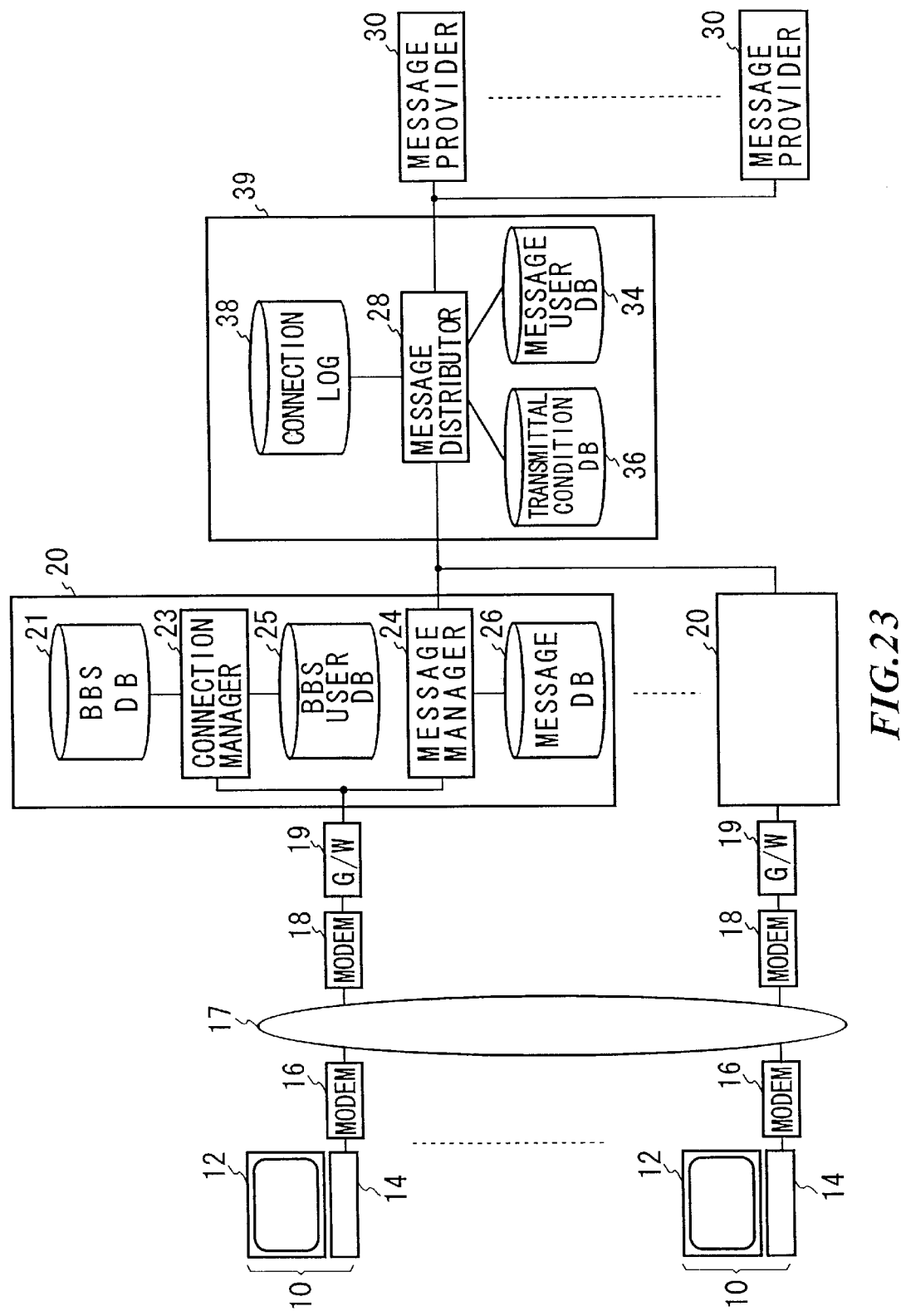
FIG. 23 is a block diagram showing a hardware structure of overall the communication system of the fourth embodiment of the invention.

FIG. 23 shows a hardware structure of the fourth embodiment. In this embodiment, the information provider 20 functions as computer communication (BBS) provider, such as PC-VAN TM or COMPUSERVE TM, instead of the Internet provider. Compared with FIG. 1, the Internet gateway 22 and the Internet 32 are not connected, instead, the PBS database is connected to the connection manager. The provider user database 25 is substituted by the BBS user database 25'.

Since the structures shown in FIGS. 2 through 5 and 8 are common with this embodiment, explanation will be omitted. In FIG. 6, the browser 74 is substituted by a character-based or image-based communication software which communicates with the BBS. In this embodiment, the browser 74 communicates with the connection manager 23.

In this embodiment, the browser 74 is TCP/IP connected to the message manager 24 at S110 of FIG. 8, and transmits and receives data to and from the message manager 24 (S112). The other connection operations in FIG. 8 and structures shown in FIGS. 9–11 and 13–22 are the common with this embodiment, and explanation will be omitted. The structure of the BBS user database 25' is the same as that of the provider user database shown in FIG. 12. However, in this embodiment, BBS ID, BBS user ID and BBS user password are used, instead of provider ID, provider user ID and provider user password.

Two independent links are generated for the BBS database 21 and the message database 26, respectively. Therefore, information which is independent from the BBS can be displayed on the message viewer window 62, even when information from the BBS is being received. Furthermore, charging from the BBS can be controlled based on the display state on the message viewer window 62. For example, when an advertisement is displayed on the message viewer window 62, BBS usage fee is not charged on the user, but is charged on the message provider 30.

Although, in the embodiment, two logical links are connected using TCP/IP, non-logical link may be connected to the connection manager 23 and a different data link may be formed from the message viewer 76 to the message manager 24.

Some Alternatives

Browser 74 displays home page information of the Internet 32 in the specific embodiments described. However, browser 74 can have an alternative arrangement to provide an Internet telephone or the Internet TV phone which allows voice communication through the Internet. Even when the browser 74 does not display specific information on the display, the message distributor 28 can control the charging operation on the connection to the Internet in a similar way to that described above with respect to the specifically described embodiments, thereby providing an Internet telephone function to the user with a less expense.

The browser 74 can also be configured and arranged to display on-demand video information. In such case, a video providing system is substituted for the Internet gateway 22, and charging for the on-demand video service may be stopped during display of additional information. This can provides less expensive on-demand video information to the user.

Although the message user database 34, the transmittal condition database 36 and the connection log 38 are shown as independent disc devices, the information from all of them can be stored in a single storage device such as a disk, tape, or other storage device. The mutual relationship among the data of the respective fields can be realized by various file structures. For example, the message user database 34, the transmittal condition database 36 and the connection log 38 may be arranged in different areas of a single file.

Timer functions can be carried out either by hardware or software, or both. A single time can be used for various timing functions, or multiple timers could be used. Also, count times can be software set.

The Internet browser window and the message display module window may be arranged in the vertical direction on the display 12. The browser 74 and the message viewer 76 may be incorporated in a single unit, and the window may be divided into two areas. If this is a case, information received from the Internet 32 and information received from the message manager 24 are separately displayed in the respective areas in a signal window.

According to the present invention most or all of the functions carried out can be software controlled. Thus programs can be provided on such media as floppy disk 56 and CD-ROM 58. The floppy disk 106 can store all or part of the software for controlling operations. These programs may be read from the medium on which they are stored directly into RAM for implementation (execution). The recording media used in the invention may include, but are not limited to, optical recording medium, such as a DVD, magnetic recording medium, such as an MD, opto-magnetic recording medium, such as a PD, tape medium, and semiconductor memory, such as an IC card and a miniature card, other than floppy disk and CD-ROM. Especially, the following recording media can be provided by the present invention which has been described in conjunction with the embodiments. Thus, it can be considered that the present invention provides:

(1) A recording medium which stores program code to be executed by a CPU of a terminal. The terminal is connected with a communication line. The program comprises (a) means for allowing communication through the communication line between CPU and the message searching system which contains user characteristic information of each user of plural terminals, (b) means for causing CPU to store the user characteristic information in the storage of the terminal, (c) means for causing CPU to detect a necessity to revise the characteristics during the communication with the message searching system, (d) means for causing CPU to request, through the communication line, a dialog which is used to revise the characteristics of the user of the terminal, when it is detected that the revision is necessary, and (e) means for causing CPU to revise the characteristics stored in the storage based on the dialog received from the communication line.

(2) The recording medium of above item (1), wherein the program further comprises means for causing CPU to store the user's birth date and the last communication date between the massage search system in the storage, and means for causing CPU to detect a necessity to revise the characteristics with the detection means, based on the determination whether the date which is obtained by adding a predetermined period to the user's birth date has passed at the time of the communication between the terminal and the message searching system and after the last communication date.

(3) The recording medium of above item (2), wherein the program further comprises means for causing CPU to receive from the message user database the database revision time when a new item is added to the message user database, and means for causing CPU to determine with the detector that it is necessary to revise the characteristics stored in the storage when the last communication date is before the database item revision time.

(4) The recording medium of above item (3), wherein the program further comprises means for causing CPU to store the user's birth date and the characteristics revision time in the storage, and means for causing CPU to detect a necessity to revise the characteristics with the detection means, based on the determination whether the date which is obtained by adding a predetermined period to the user's birth date has passed at the time of the user's connection to the message searching system and after the last revision time.

(5) The recording medium of above item (4), wherein the program further comprises means for causing CPU to receive from the message user database the database revision time when a new item is added to the message user database, and means for causing CPU to determine with the detector that it is necessary to revise the characteristics stored in the storage when the last revision time is before the database item revision time.

(6) The recording medium of any one of above items (1) through (5), wherein the program further comprises means for causing CPU to compare the characteristics revision time about the terminal user, which is stored in the storage, with the characteristics revision time stored in the message searching system, when the terminal connects to the message searching system, and means for causing CPU to transmit the characteristics stored in the storage to the message searching system when the characteristics revision time in the message searching system is before the characteristics revision time stored in the storage.

(7) The recording medium of any one of above item (1) through (6), wherein the program further comprises means for causing CPU to compare the characteristics revision time about the terminal user, which is stored in the storage, with the characteristics revision time stored in the message searching system, when the terminal connects to the message searching system, means for causing CPU to receive the characteristics stored in the message searching system when the characteristics revision time in the message searching system is after the characteristics revision time stored in the storage, and means for causing CPU to revise the characteristics stored in the storage.

(8) The recording medium of any one of above item (1) through (7), wherein the program further comprises revision detector for causing CPU to detect the fact that the user has revised the characteristics stored in the storage, and means causing CPU to transmit the characteristics stored in the storage to the message searching system, when the revision detector detects the fact that the characteristics has been revised.

(9) A recording medium which stores a program to be executed by CPU, the program comprises (a) storage for causing CPU to store process information that is read and processed by CPU, (b) memory for causing CPU to store the position where the process information is stored in the storage, (c) input means for causing CPU to request the user to input the ID to identify the user of the terminal, (d) determination means for causing CPU to determine the position of the process information in the storage when processing the process information, (e) re-input means for causing CPU to request the user to input the ID of the user of the terminal again when the position of the process information stored in the memory is different from the position determined by the determination means, and (f) user determination means for causing CPU to determine that, when the ID inputted through the re-input means is different from the ID which was inputted through the input means, different user is using the terminal from the original user who inputted the ID through the input means.

(10) The recording medium of above item (9), wherein the program further comprises means for causing CPU to request the user to input the user password through the input means, means for causing CPU to request the user to input the user password again through the re-input means when the position of the process information stored by the memory is different from the position determined by the determination means, and means for causing CPU to determine that the different user is using the terminal from the original user who inputted the ID through the input means through the user determination means, when the password inputted from the reinput means is different from the password which was inputted from the input means.

(11) The recording medium of above item (9) or (10), wherein the program to be executed by CPU is the process information.

(12) The recording medium of any one of above items (9) to (11), wherein the program further comprises means for allowing the communication between CPU and the information processor through the communication line, and means for causing CPU to inquire if the ID and the password which were inputted through the re-input means has been registered in the information processor, when it is determined by the user determination means that the different user is using the terminal from the user who originally inputted the ID.

Recording medium which stores the program for implementing the function of the message viewer 76, recording medium which stores the program for implementing the function of the message manager 24 and recording medium which stores the program for implementing the message distributor 28 are used exclusively to manufacture the terminal 10, the message manager 24 and the message distributor 28, respectively. Therefore, it is obvious that make and sale of such recording media will construct infringement against a patent right based on the present invention.

Although the present invention has been described in conjugation with specific embodiments, the present invention is not limited to the embodiments. Many modifications and substitutions are apparent for those skilled in the art without departing from the spirit and the scope of the invention, which is defined by the appended claims.

ADVANTAGE OF THE INVENTION

According to the invention, appropriate display information which is suitable to the updated user characteristics can be selected and displayed on the terminal, even if the user characteristics change as time passes. Even when a plurality of users copy and use the same program, information can be displayed on the terminal, which suits to each user.

What is claimed is:

1. A message delivery system for providing messages to users interacting therewith via a terminal and a communication line, the system comprising:

a message user database for storing user records constituting a profile of characteristics of each of plural users a transmittal condition database for storing message records containing identification (ID) information related to messages that can be transmitted to the terminal, together with transmittal conditions for each message a detector for determining a necessity to revise the user records based on information received from the terminal revising means for revising the user records stored in the message user database when the detector detects the necessity to do so reading means for reading the user records to obtain a profile from the message user database in response to a request from the terminal means for searching the transmittal condition database using characteristics from user records read by the reading means to locate message records whose transmittal conditions are consistent with the read profile and obtaining ID information for located message records means for transmitting the ID information for located message records to the terminal wherein:
the characteristics profile for each user includes the user's birth date and a last communication time indicating when the user last communicated with the system the detector determines the necessity when a time obtained by adding a predetermined value to the user's birth date is earlier than a current time and later than the last communication time.

2. The message delivery system for providing messages to users interacting therewith via a terminal and a communication line according to claim 1, further comprising:

means for adding a new item of data corresponding to a user characteristic to each user record of the message user database;

means for storing an item revision time indicating when the message user database was last modified to include a new item of data, and wherein the detector detects the necessity when the last communication time is earlier than the item revision time.

3. The message delivery system for providing messages to users interacting therewith via a terminal and a communication line as set forth in claim 1 further comprising:

means for uploading the terminal revision time from the terminal to the system when the terminal is connected to the message searching system;

means for comparing the terminal revision time with the characteristics revision time;

means for uploading the characteristics stored in the terminal when the characteristics revision time is earlier than the terminal revision time; and means for revising records of the message user database using characteristics uploaded from the terminal.

4. A message delivery system for providing messages to users interacting therewith via a terminal and a communication line, the system comprising:

a message user database for storing user records comprising a profile of characteristics of each of plural users a transmittal condition database for storing message records containing identification (ID) information related to messages that can be transmitted to the terminal, together with transmittal conditions for each message a detector for determining a necessity to revise the user records based on information received from the terminal revising means for revising the user records stored in the message user database when the detector detects the necessity to do so reading means for reading the user records to obtain a profile from the message user database in response to a request from the terminal means for searching the transmittal condition database using characteristics from user records read by the reading means to locate message records whose transmittal conditions are consistent with the read profile and obtaining ID information for located message records means for transmitting the ID information for located message records to the terminal wherein:
the user records of the message user database include a user's birth date and a characteristic revision time indicating a revision time of the characteristics in the profile; and the detector detects the necessity when a time obtained by adding a predetermined value to the user's birth date is earlier than a current time and later than the characteristic revision time.

5. The message delivery system for providing messages to users interacting therewith via a terminal and a communication line according to claim 4, further comprising:

means for adding a new item of data to each record of the message user database; and means for storing an item revision time indicating a time when the new item it added to the message user database, and wherein the detector detects the necessity when the characteristic revision time is earlier than the item revision time.

6. The message delivery system for providing messages to users interacting therewith via a terminal and a communication line as set forth in claim 4 further comprising:

means for uploading the terminal revision time from the terminal to the system when the terminal is connected to the message searching system;

means for comparing the terminal revision time with the characteristics revision time;

means for uploading the characteristics stored in the terminal when the characteristics revision time is earlier than the terminal revision time; and means for revising records of the message user database using characteristics uploaded from the terminal.

7. The message delivery system for providing messages to users interacting therewith via a terminal and a communication line according to any one of the claims 1 to 5, further comprising:

means, in the terminal, for locally storing a terminal revision time indicating a revision time of a user's profile;

means for uploading from the terminal to the system the terminal revision time when the terminal is connected to the system;

means for comparing the terminal revision time with the characteristics revision time; and means for downloading from the system to the terminal characteristics stored in the message user database when the characteristics revision time is later than the terminal revision time.

8. A terminal for communicating with a message delivery system for providing messages to users interacting therewith via the terminal and a communication line, comprising:

a storage for storing characteristics of a user of the terminal a detector for detecting a necessity to revise the characteristics based on information received from the message system means for requesting through the communication line a dialog for revising the characteristics when the detector detects the necessity input means for inputting new characteristics of the user using the dialog means for revising the characteristics stored in the storage using the new characteristics input by the input means wherein:
the storage stores a user's birth date and a last communication time with the system
the detector detects the necessity based on whether a time obtained by adding a predetermined period to the user's birth date is earlier than a current time and later than the last communication time.

9. The terminal for communicating with a message delivery system for providing messages to users interacting therewith via the terminal and a communication line according to claim 8, further comprising:

means for receiving from the message user database an item revision time indicating a time when a new item is added to the message user database, and wherein the detector detects the necessity when the last communication time is earlier than the item revision time.

10. The terminal for communicating with a message delivery system for providing messages to users interacting therewith via the terminal and a communication line as set forth in claim 8 wherein the system stores characteristics of each user and a characteristic revision time, the terminal further comprising means for downloading the characteristic time from the message searching system, when connected to the message searching system means for comparing the terminal revision time with the characteristics revision time receiving means for downloading the characteristics stored in the system when the characteristics revision time is later than the terminal revision time means for revising the characteristics stored in the storage using the characteristics received by the receiving means.

11. The terminal for communicating with a message delivery system for providing messages to users interacting therewith via the terminal and a communication line as set forth in claim 8 further comprising a detector for detecting the characteristics in the storage being revised by the user means for uploading the characteristics in the storage to the message searching system when the detector detects the characteristics in the storage being revised.

12. A terminal for communicating with a message delivery system for providing messages to users interacting therewith via the terminal and a communication line, comprising:

a storage for storing characteristics of a user of the terminal a detector for detecting a necessity to revise the characteristics based on information received from the message system means for requesting through the communication line a dialog for revising the characteristics when the detector detects the necessity input means for inputting new characteristics of the user using the dialog means for revising the characteristics stored in the storage using the new characteristics input by the input means wherein:
the storage stores the user's birth date and the terminal revision time indicating a last revision time of the characteristics of the user; and
the detector detects the necessity based on whether a time obtained by adding a predetermined period to the user's birth date is earlier than a current time and later than the revision time.

13. The terminal for communicating with a message delivery system for providing messages to users interacting therewith via the terminal and a communication line according to claim 12, further comprising:

means for receiving an item revision time indicating a time when a new item is added to the message user database, from the message user database, and wherein the detector detects the necessity when the last revision time is earlier than the item revision time.

14. The terminal for communicating with a message delivery system for providing messages to users interacting therewith via the terminal and a communication line as set forth in claim 12 wherein the system stores characteristics of each user and a characteristic revision time, the terminal further comprising:

means for downloading the characteristic revision time from the message searching system, when connected to the message searching system;

means for comparing the terminal revision time with the characteristics revision time; and receiving means for downloading the characteristics stored in the system when the characteristics revision time is later than the terminal revision time and means for revising the characteristics stored in the storage using the characteristics received by the receiving means.

15. The terminal for communicating with a message delivery system for providing messages to users interacting therewith via the terminal and a communication line as set forth in claim 12 further comprising:

a detector for detecting the characteristics in the storage being revised by the user; and means for uploading the characteristics in the storage to the message searching system when the detector detects the characteristics in the storage being revised.

16. The terminal for communicating with a message delivery system for providing messages to users interacting therewith via the terminal and a communication line according to any of the claims 8 to 13, wherein the message searching system has characteristics of each user and a characteristic revision time, and the terminal further comprises:

means for downloading the characteristic revision time from the system, when connected to the message searching system;

means for comparing the terminal revision time with the characteristics revision time; and means for uploading the characteristics stored in the storage to the system when the characteristics revision time is earlier than the terminal revision time.

17. A method of providing messages to users interacting with a message distribution system via a terminal and a communication line, the method comprising providing a first database for storing user records, the user records constituting a profile of characteristics of each of plural users, the profile for each user including the user's birth date and a last communication time indicating when the user last communicated with the system providing a second database for storing message records, the message records including identification (ID) information related to messages that can be transmitted to the terminal, together with transmittal conditions for each message determining a necessity to revise the user records when a time obtained by adding a predetermined value to the user's birth date is earlier than a current time and later than the last communication time revising the user records stored in the first database when the detector detects the necessity to do so reading the user records to obtain a characteristics profile from the first database in response to a request from the terminal searching the second database using characteristics from read user records to locate message records whose transmittal conditions are consistent with the read characteristic profile and obtaining ID information for located message records transmitting the ID information for located message records to the terminal.

18. The method of providing messages to users of claim 17, the method further comprising adding a new item of data corresponding to a user characteristic to each user record of the first database storing an item revision time indicating when the first database was last modified to include a new item of data determining the necessity also if the last communication time is earlier than the item revision time.

19. A method of providing messages to users interacting with a message distribution system via a terminal and a communication line, the method comprising providing a first database for storing user records, the user records comprising a profile of characteristics of each of plural users and a user's birth date and a characteristic revision time indicating a revision time of the characteristics providing a second database for storing message records, the message records containing identification (ID) information related to messages that can be transmitted to the terminal, together with transmittal conditions for each message determining a necessity to revise the user records when a time obtained by adding a predetermined value to the user's birth date is earlier than a current time and later than the characteristic revision time revising the user records stored in the first database when the detector detects the necessity to do so reading the user records to obtain a profile from the first database in response to a request from the terminal searching the second database using characteristics from read user records to locate message records whose transmittal conditions are consistent with the read profile and obtaining ID information for located message records transmitting the ID information for located message records to the terminal.

20. The method of providing messages to users of claim 19, the method further comprising:

adding a new item of data to each record of the first database storing an item revision time indicating a time when the new item is added to the first database determining the necessity also if the characteristic revision time is earlier than the item revision time.

21. A method of providing messages to users interacting with a message delivery system via a terminal and a communication line, the method comprising storing characteristics of a user of the terminal including the user's birth date and a last communication time with the system detecting a necessity to revise the characteristics based on whether a time obtained by adding a predetermined period to the user's birth date is earlier than a current time and later than the last communication time requesting through the communication line a dialog for revising the characteristics when the detector detects the necessity inputting new characteristics of the user using the dialog revising the stored characteristics using the new characteristics.

22. The method of providing messages to users according to claim 21, wherein the characteristics are stored in a database, the method further comprising receiving from the database an item revision time indicating a time when a new item is added to the database, and determining the necessity also if the last communication time is earlier than the item revision time.

23. A method of providing messages to users interacting with a message delivery system via a terminal and a communication line, the method comprising storing characteristics of a user of the terminal including the user's birth date and the terminal revision time indicating a last revision time of the characteristics of the user detecting a necessity to revise the characteristics based on whether a time obtained by adding a predetermined period to the user's birth date is earlier than a current time and later than the last revision time requesting through the communication line a dialog for revising the characteristics when the detector detects the necessity inputting new characteristics of the user using the dialog revising the stored characteristics using the new characteristics.

24. The method of providing messages to users according to claim 23, wherein the characteristics are stored in a database, the method further comprising receiving an item revision time indicating a time when a new item is added to the database determining the necessity also if the last revision time is earlier than the item revision time.

25. A method of providing messages to users interacting with a host system via a terminal and a communication line, the method comprising:

storing user records comprising a user ID and a profile of characteristics of each of plural users in a first database, the profiles including age information of the users storing message records in a second database, the message records including message IDs related to messages that can be transmitted to the terminal, together with transmittal conditions determining a necessity to revise a given user record when a comparison of the age information in the given user record and a current date reflects that a current age of the user corresponding to the given user record has passed a predetermined value when the necessity to revise the given user record has been determined requesting the user corresponding to the given user record to input information into the terminal about a certain item which is associated with the predetermined value, wherein requesting information about the certain item before the user's age has reached the predetermined value is improper revising the given user record stored in the message user database with the input information receiving a message request from a given terminal, the message request including one of the user IDs in response to receiving the message request reading the profile of the user record corresponding to the message user identifier from the first database searching the second database using the profile from the read user record to locate message records whose transmittal conditions are consistent with the read profile and obtaining message IDs for located message records transmitting the message IDs for located message records to the given terminal.

26. The method of providing messages to users interacting with a host system of claim 25, wherein the predetermined value is 20 years.

27. A method of managing profiles of terminal users by a host system, the method comprising:

in a first online session between a terminal and the host system, the host system transmitting a message to the terminal requesting age information of the user of the terminal the host system receiving age information of the user of the terminal from the terminal the host system storing the age information in a user record in a first database, the user record comprising a profile of characteristics of the user in a second online session between the terminal and the host system, the host system comparing the age information of the user of the terminal to the current time and a predefined value, and thereby determining if the user's age has passed the predefined value if the user's age has passed the predefined value, then the host system obtaining personal info of the user the host system revising the user record with the users answers the host system using the characteristic profile of the user, including at least some of the personal info, to select information to transmit to the user.

28. The method of managing characteristic profiles of terminal users by a host system of claim 27, wherein the predefined value is 20 years.

29. A host system connected to a terminal via a communication line, the host system comprising a first database for storing user records comprising a user ID and a profile of characteristics of each of plural users in a first database, the profiles including age information of the users a second database for storing message records in a second database, the message records including message IDs related to messages that can be transmitted to the terminal, together with transmittal conditions program code means for determining a necessity to revise a given user record when a comparison of the age information in the given user record and a current date reflects that a current age of the user corresponding to the given user record has passed a predetermined value program code means for, when the necessity to revise the given user record has been determined requesting the user corresponding to the given user record to input information into the terminal about a certain item which is associated with the predetermined value, wherein requesting information about the certain item before the user's age has reached the predetermined value is improper revising the given user record stored in the message user database with the input information program code means for receiving a message request from a given terminal, the message request including one of the user IDs program code means for, in response to receiving the message request reading the profile of the user record corresponding to the message user identifier from the first database searching the second database using the profile from the read user record to locate message records whose transmittal conditions are consistent with the read profile and obtaining message IDs for located message records program code means for transmitting the message IDs for located message records to the given terminal.

30. The host system connected to a terminal via a communication line of claim 29, wherein the predetermined value is 20 years.

31. A host system for managing profiles of characteristics of terminal users, the host system comprising program code means for transmitting a message to a terminal, the message requesting age information of the user of the terminal program code means for receiving age information of the user of the terminal from the terminal program code means for storing the age information in a user record in a first database, the user record comprising a profile of the user program code means for comparing the age information of the user of the terminal to the current time and a predefined value, and thereby determining if the user's age has passed the predefined value program code means for, if the user's age has passed the predefined value, then obtaining personal info of the user revising the user record with the users answers using the profile of the user, including at least some of the personal info, to select information to transmit to the user.

32. The host system for managing characteristic profiles of terminal users of claim 31, wherein the predefined value is 20 years.

\* \* \* \* \*